(12) United States Patent
Yu et al.

(10) Patent No.: US 10,650,563 B2
(45) Date of Patent: May 12, 2020

(54) TONGUE POSITION TRACKING FOR FACIAL ANIMATION

(71) Applicant: BinaryVR, Inc, Burlingame, CA (US)

(72) Inventors: Jihun Yu, Redwood City, CA (US);
Jungwoon Park, Foster City, CA (US);
Junggun Lim, San Mateo, CA (US);
Taeyoon Lee, Kyung-ki Do (KR)

(73) Assignee: BinaryVR, Inc., Burlingame, CA (US)

( * ) Notice: Subject to any disclaimer, the term of this patent is extended or adjusted under 35 U.S.C. 154(b) by 0 days.

(21) Appl. No.: 16/046,904

(22) Filed: Jul. 26, 2018

(65) Prior Publication Data

US 2020/0035007 A1   Jan. 30, 2020

(51) Int. Cl.
*G06T 13/40* (2011.01)
*G06K 9/00* (2006.01)

(52) U.S. Cl.
CPC .......... *G06T 13/40* (2013.01); *G06K 9/00248* (2013.01); *G06K 9/00261* (2013.01); *G06K 9/00308* (2013.01)

(58) Field of Classification Search
None
See application file for complete search history.

(56) References Cited

U.S. PATENT DOCUMENTS

| | | | |
|---|---|---|---|
| 5,995,119 A | 11/1999 | Cosatto et al. | |
| 6,483,513 B1 | 11/2002 | Haratsch et al. | |
| 6,593,936 B1 | 7/2003 | Huang et al. | |
| 6,990,452 B1 | 1/2006 | Ostermann et al. | |
| 7,168,953 B1 | 1/2007 | Poggio et al. | |
| 7,908,554 B1 | 3/2011 | Blattner | |
| 9,898,849 B2 | 2/2018 | Du et al. | |
| 2004/0151379 A1* | 8/2004 | Kim | A61B 5/416 382/209 |
| 2012/0259554 A1 | 10/2012 | Chen et al. | |
| 2013/0016124 A1 | 1/2013 | Han et al. | |
| 2014/0022249 A1 | 1/2014 | Ye et al. | |
| 2014/0342324 A1 | 11/2014 | Ghovanloo et al. | |

(Continued)

OTHER PUBLICATIONS

TangoChen, "Tip-of-tongue detection", http://tangochen.com/blog/?p=450, Oct. 7, 2012 (Year: 2012).*

(Continued)

*Primary Examiner* — Phi Hoang
*Assistant Examiner* — Steven Z Elbinger
(74) *Attorney, Agent, or Firm* — McDonnell Boehnen Hulbert & Berghoff LLP

(57) ABSTRACT

A method is provided that includes receiving, from a camera, a plurality of images representing a portion of a face containing a mouth. One or more images of the plurality of images depict a tongue extended out of the mouth. The method also includes determining, based on the plurality of images, an amount of time for which the tongue has been extended out of the mouth. The method additionally includes determining, based on the amount of time, a tongue length for a digital representation of the tongue. The digital representation of the tongue forms part of a digital representation of the face. The method further includes adjusting the digital representation of the face to have the digital representation of the tongue extend out of the mouth with the determined tongue length. The method yet further includes providing instructions to display the adjusted digital representation of the face.

20 Claims, 10 Drawing Sheets

(56) References Cited

U.S. PATENT DOCUMENTS

| | | | |
|---|---|---|---|
| 2015/0332088 A1 | 11/2015 | Chembula | |
| 2016/0042548 A1 | 2/2016 | Du et al. | |
| 2016/0247309 A1* | 8/2016 | Li | G06F 3/011 |
| 2016/0275341 A1 | 9/2016 | Li et al. | |
| 2016/0278670 A1* | 9/2016 | Schoettker | A61B 5/7267 |
| 2016/0300379 A1* | 10/2016 | Du | G06T 13/205 |
| 2016/0328874 A1 | 11/2016 | Tong et al. | |
| 2016/0328875 A1* | 11/2016 | Fang | G06T 13/40 |
| 2017/0091535 A1 | 3/2017 | Yu et al. | |
| 2017/0160797 A1* | 6/2017 | Mora | G06F 3/012 |
| 2018/0189549 A1* | 7/2018 | Inomata | G06K 9/00281 |
| 2018/0373922 A1* | 12/2018 | Yang | G06K 9/00 |

OTHER PUBLICATIONS

Wang, Yong-Xiang, Li-Yun Lo, and Min-Chun Hu. "Eat as much as you can: a kinect-based facial rehabilitation game based on mouth and tongue movements." In Proceedings of the 22nd ACM international conference on Multimedia, pp. 743-744. ACM, 2014. (Year: 2014).*

Harry Fairhead, "Using the Kinect Depth Sensor", https://web.archive.org/web/20151019083835/https://www.i-prograrmmer.info/ebooks/practical-windows-kinect-in-c/3802-using-the-kinect-depth-sensor.html, Feb. 20, 2012 (Year: 2012).*

Jihun Yu; Jungwoon Park; Junggun Lim, Live Demo at Conference on Computer Vision and Pattern Recognition, Jun. 19, 2018, 5 Pages.

Xu et al., Development of a 3D Tongue Motion Visualization Platform Based on Ultrasound Iimage Sequences, The 18th International Congress of Phonetic Sciences, Aug. 2015, 5 Pages.

Olszewski et al., High-Fidelity Facial and Speech Animation for VR HMDs, ACM Transactions on Graphics, vol. 35 Issue 6, Nov. 2016, 13 Pages.

Kawai et al., Automatic Generation of Photorealistic 3D Inner Mouth Animation only from Frontal Images, Journal of Information Processing, vol. 23 Issue 5, Sep. 2015, 12 Pages.

Fabre et al., Automatic Animation of an Articulatory Tongue Model from Ultrasound Images of the Vocal Tract, Speech Communication, vol. 93, Oct. 2017, 25 Pages.

Jingzhou Chen, Kv2 Tongue Tracking—Tip of Tongue Tracking with Kinect v2, Published Nov. 30, 2014, http://tangochen.com/blog/?p=1972, 2 Pages.

Jingzhou Chen, Kv2TongueTracking, Published Nov. 30, 2014, https://github.com/TangoChen/Kv2TongueTracking, 2 Pages.

Recognition Capabilities of the Intel RealSense Camera, Accessed Jul. 25, 2018, https://www.intel.com/content/www/us/en/support/articles/000006099/emerging-technologies.html, 10 Pages.

Elizabeth Stinson, Apple's Animoji Will Teach You to Love Face Tracking, for Better or Worse, Wired, Published Sep. 13, 2017, https://www.wired.com/story/apple-animoji-face-tracking/, 14 Pages.

Mulligan et al., A Low Cost Con-contact Approach to Tongue Tracking for Special Needs Children, 30th Conference of the Canadian Medical and Biological Engineering Society, Jun. 2007, 5 Pages.

* cited by examiner

| PHYSICAL TONGUE CUMULATIVE EXPOSURE TIME | DIGITAL TONGUE EXTENSION | DIGITAL TONGUE APPEARANCE |
|---|---|---|
| 0 SECONDS | 0% | 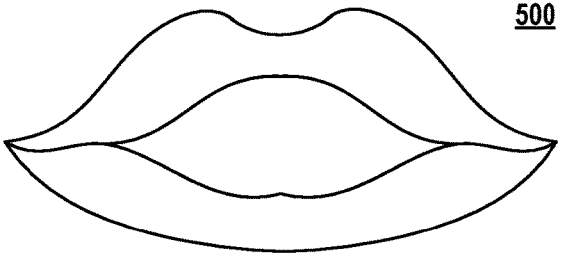 500 |
| ⋮ | ⋮ | ⋮ |
| 1 SECOND | 33.3% | 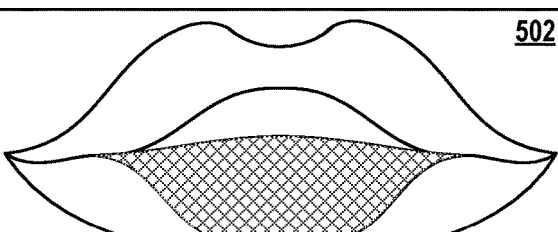 502 |
| ⋮ | ⋮ | ⋮ |
| 2 SECONDS | 66.6% | 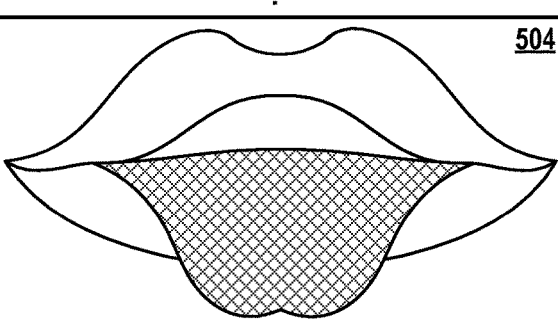 504 |
| ⋮ | ⋮ | ⋮ |
| 3 SECONDS | 100% | 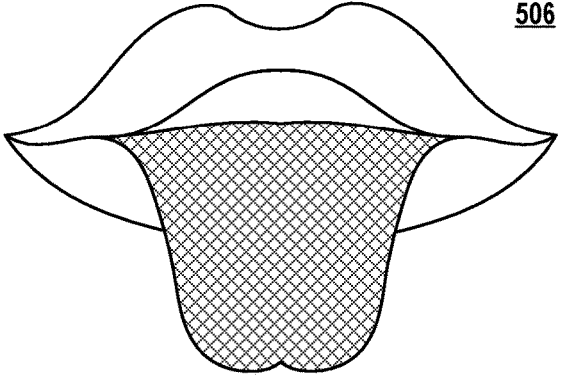 506 |
Figure 5A

| SAMPLE / TIME | PHYSICAL TONGUE EXPOSED? | PHYSICAL TONGUE CUMULATIVE EXPOSURE TIME | DIGITAL TONGUE EXTENSION |
|---|---|---|---|
| 0 / 0.0 SECONDS | NO | 0 SECONDS | 0% |
| 1 / 0.5 SECONDS | YES | 0.5 SECONDS | 16.6% |
| 2 / 1.0 SECONDS | YES | 1.0 SECONDS | 33.3% |
| 3 / 1.5 SECONDS | YES | 1.5 SECONDS | 50.0% |
| 4 / 2.0 SECONDS | YES | 2.0 SECONDS | 66.6% |
| 5 / 2.5 SECONDS | YES | 2.5 SECONDS | 83.3% |
| 6 / 3.0 SECONDS | NO | 2.0 SECONDS | 66.6% |
| 7 / 3.5 SECONDS | NO | 1.5 SECONDS | 50.0% |
| 8 / 4.0 SECONDS | YES | 2.0 SECONDS | 66.6% |
| 9 / 4.5 SECONDS | YES | 2.5 SECONDS | 83.3% |
| 10 / 5.0 SECONDS | YES | 3.0 SECONDS | 100.0% |
| 11 / 5.5 SECONDS | YES | 3.0 SECONDS | 100.0% |
| 12 / 6.0 SECONDS | NO | 2.5 SECONDS | 83.3% |
| 13 / 6.5 SECONDS | NO | 2.0 SECONDS | 66.6% |
| 14 / 7.0 SECONDS | NO | 1.5 SECONDS | 50.0% |
| 15 / 7.5 SECONDS | NO | 1.0 SECONDS | 33.3% |
| 16 / 8.0 SECONDS | NO | 0.5 SECONDS | 16.6% |
| 17 / 8.5 SECONDS | NO | 0.0 SECONDS | 0.0% |
| 18 / 9.0 SECONDS | NO | 0.0 SECONDS | 0.0% |

Figure 5B

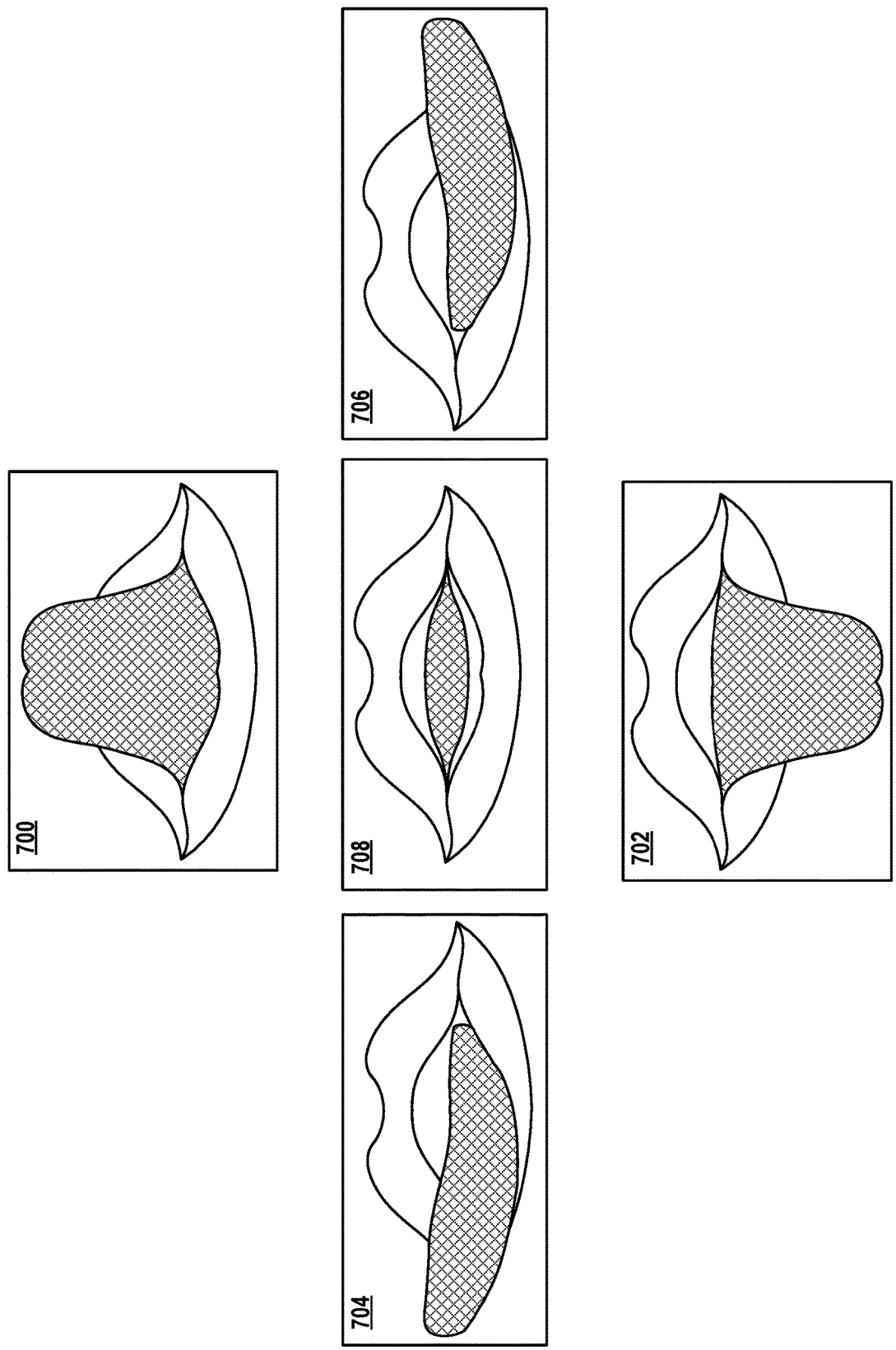

TONGUE POSITION TRACKING FOR FACIAL ANIMATION

BACKGROUND

Virtual reality (VR) involves a computer-generated simulation of experiences that replaces a user's real-world environment. Similarly, augmented reality (AR), sometimes considered a subset of VR technology, involves a direct or indirect view of a physical, real-world environment that is augmented, rather than replaced, by computer-generated perceptual information. VR and AR may include multiple types of sensory information, including visual, auditory, haptic, somatosensory, and olfactory. The immersive experiences generated by VR and AR make them applicable in various technologies such as gaming, education, medicine, and social networking, among others. VR and AR often rely on headsets or multi-projected environments, as well as various peripherals, to generate the images, sounds, and other sensations of the simulated experience.

SUMMARY

In an example embodiment, a facial expression of a digital representation of a head may be adjusted to match facial expressions, including tongue movements, of a user in the real world. The user may stick their tongue out and move it around in various directions. A digital representation of the tongue, included as part of the digital representation of the head or face, may be animated to match the movements of the user's tongue. To that end, the user's mouth area, and possibly other areas of the face, may be monitored using a camera and, in some cases, a depth sensor. Image data from the camera and depth data from the depth sensor may be used to detect the tongue and monitor its movements.

A length of the digital tongue may be adjusted based on an amount of time for which the user's physical tongue has been exposed. Thus, exposing the physical tongue may lengthen the digital tongue while hiding the physical tongue may shorten the digital tongue. Additionally, in some embodiments, a direction in which the physical tongue is pointed may be tracked as well or instead by detecting a position of a tip of the physical tongue relative to a center of the user's mouth, by identifying occluded landmark locations on the user's lips, or via a combination thereof. The tongue length and/or tongue direction of the digital representation of the tongue may be periodically adjusted or animated to mimic the movements of the user's physical tongue in real-time.

In a first embodiment, a method is provided that includes receiving, by a processor and from a camera, a plurality of images representing a portion of a face containing a mouth. One or more images of the plurality of images depict a tongue extended out of the mouth. The method also includes determining, by the processor, based on the plurality of images, an amount of time for which the tongue has been extended out of the mouth. The method additionally includes determining, by the processor, based on the amount of time for which the tongue has been extended out of the mouth, a tongue length for a digital representation of the tongue. The digital representation of the tongue forms part of a digital representation of the face. The method further includes adjusting, by the processor, the digital representation of the face to have the digital representation of the tongue extend out of the mouth with the determined tongue length. The method yet further includes providing, by the processor, instructions to display the digital representation of the face adjusted to have the digital representation of the tongue extend out of the mouth with the determined tongue length.

In a second embodiment, a computing system is provided that includes a camera, a display, and computing hardware. The computing hardware is configured to receive, from the camera, a plurality of images representing a portion of a face containing a mouth. One or more images of the plurality of images depict a tongue extended out of the mouth. The computing hardware is also configured to determine, based on the plurality of images, an amount of time for which the tongue has been extended out of the mouth. The computing hardware is additionally configured to determine, based on the amount of time for which the tongue has been extended out of the mouth, a tongue length for a digital representation of the tongue. The digital representation of the tongue forms part of a digital representation of the face. The computing hardware is further configured to adjust the digital representation of the face to have the digital representation of the tongue extend out of the mouth with the determined tongue length. The computing hardware is yet further configured to provide instructions to display, on the display, the digital representation of the face adjusted to have the digital representation of the tongue extend out of the mouth with the determined tongue length.

In a third embodiment, a non-transitory computer-readable storage medium is provided having stored thereon instructions that, when executed by a computing device, cause the computing device to perform operations. The operations include receiving, from a camera, a plurality of images representing a portion of a face containing a mouth. One or more images of the plurality of images depict a tongue extended out of the mouth. The operations also include determining, based on the plurality of images, an amount of time for which the tongue has been extended out of the mouth. The operations additionally include determining, based on the amount of time for which the tongue has been extended out of the mouth, a tongue length for a digital representation of the tongue, wherein the digital representation of the tongue forms part of a digital representation of the face. The operations further include adjusting the digital representation of the face to have the digital representation of the tongue extend out of the mouth with the determined tongue length. The operations yet further include providing instructions to display the digital representation of the face adjusted to have the digital representation of the tongue extend out of the mouth with the determined tongue length.

In a fourth embodiment, a system is provided that includes means for receiving, from a camera, a plurality of images representing a portion of a face containing a mouth. One or more images of the plurality of images depict a tongue extended out of the mouth. The system also includes means for determining, based on the plurality of images, an amount of time for which the tongue has been extended out of the mouth. The system additionally includes means for determining, based on the amount of time for which the tongue has been extended out of the mouth, by the processor, a tongue length for a digital representation of the tongue. The digital representation of the tongue forms part of a digital representation of the face. The system further includes means for adjusting the digital representation of the face to have the digital representation of the tongue extend out of the mouth with the determined tongue length. The system yet further includes means for providing instructions to display the digital representation of the face adjusted to have the digital representation of the tongue extend out of the mouth with the determined tongue length.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5A illustrates tongue extensions, in accordance with example embodiments.

FIG. 5B illustrates a sequence of samples for tongue detection, in accordance with example embodiments.

FIG. 7 illustrates different tongue expressions, in accordance with example embodiments.

DETAILED DESCRIPTION

Figure 1:
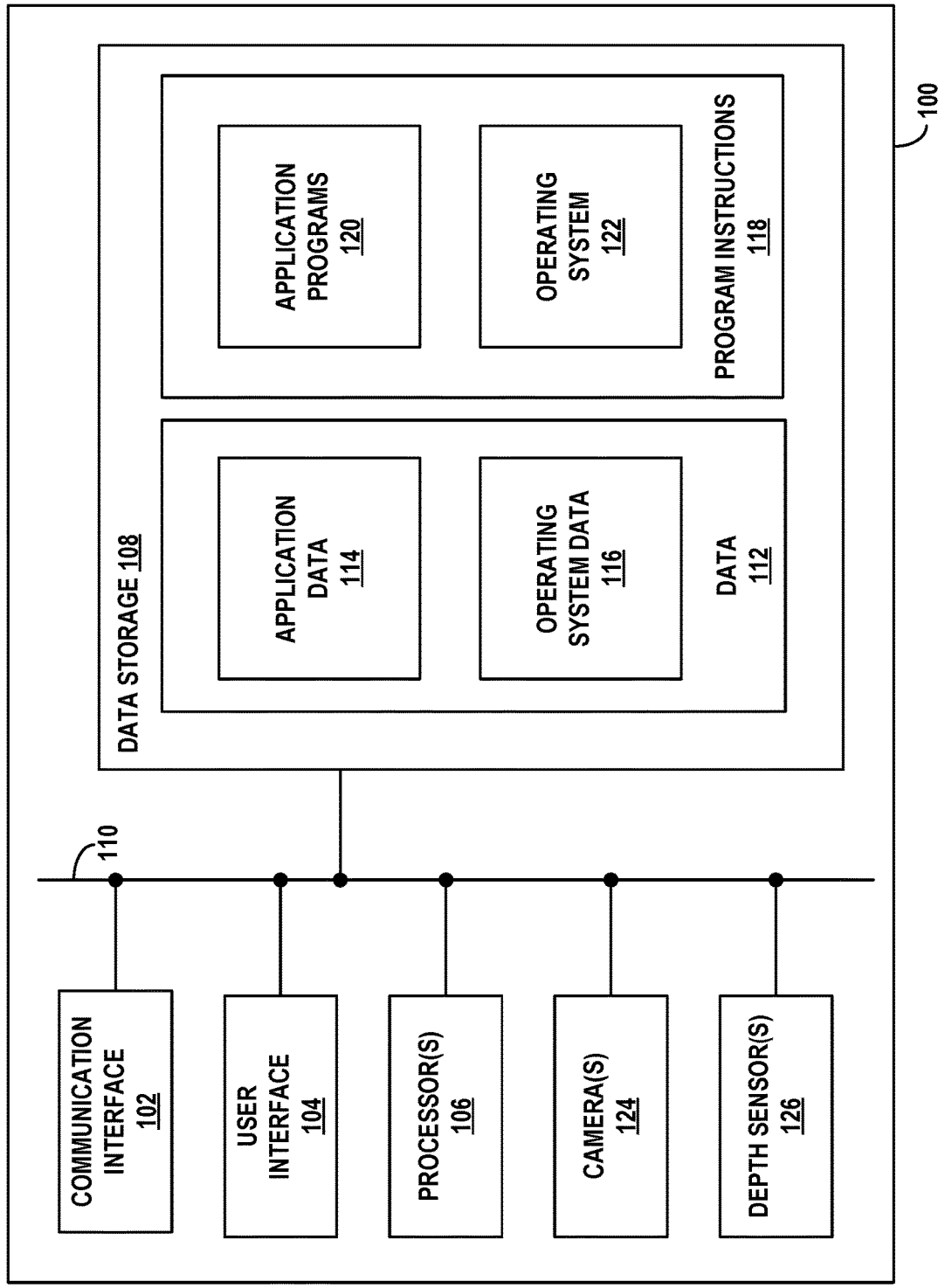
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Computing devices such as smartphones and head-mounted displays (HMDs) may allow for real-time detection of a user's facial expressions and physical tongue movements. Such computing devices may be equipped with vision sensors (e.g., cameras, depth sensors, etc.) that allow data (e.g., color images, depth maps) representing the facial expressions and physical tongue movements to be captured. Once captured, the data may be processed to extract therefrom information allowing a digital representation of the user's face and a digital representation of the user's tongue to be adjusted or transformed to match the user's actual, real-world facial expressions and physical tongue movements. The digital representation may be animated in real-time based on a stream of data from the vision sensors to mimic the user's actual facial expressions and physical tongue movements. The digital representation may be used in combination with various VR and AR technologies to enhance users' VR or AR experiences.

Animating a digital representation of the tongue (i.e., a digital tongue) may involve controlling a length of the digital tongue and/or a direction in which the digital tongue is pointed. In some cases, animating the digital tongue may further include controlling a width and a conformation of the digital tongue (e.g., flat tongue, rolled tongue, etc.). These parameters of the tongue may be controlled based on image data and/or depth data representing a portion of a face that includes the lips and mouth.

The length of the digital tongue may be controlled based on an amount of time for which the physical tongue has been exposed outside the mouth. While the physical tongue remains exposed, the digital tongue may lengthen up to a maximum length. While the physical tongue is hidden, the digital tongue may shorten to a minimum length (e.g., tongue hidden). Image and depth data may be periodically evaluated to determine whether the physical tongue is exposed or hidden. When the physical tongue is exposed, a physical tongue cumulative exposure time counter may be increased by a predetermined amount. On the other hand, when the physical tongue is hidden, the cumulative exposure time counter may be decreased by the predetermined amount. The length of the digital tongue may be adjustable to a plurality of different lengths based on the value of the cumulative exposure time counter. The cumulative exposure time counter may range from a minimum to a maximum value, with the minimum value corresponding to a hidden digital tongue and the maximum value corresponding to a fully exposed digital tongue.

The length of the digital tongue may also be adjusted based on an actual length of the physical tongue as determined based on the image and depth data. However, because the actual length of the physical tongue depends on analysis of images which may vary in quality using image processing algorithms which might sometimes be inaccurate, the determined actual length might include high-frequency variations. Such high-frequency variations may result in a digital tongue animation that is not smooth (e.g., that jitters or fluctuates quickly) and therefore produces a poor user experience. On the other hand, the binary determination of whether the physical tongue is exposed, combined with an integration of this information by the cumulative exposure time counter, is much more stable, thus allowing for a smooth animation of changes in the digital tongue length. Additionally, the binary determination of whether the physical tongue is exposed or not is less computationally intensive than the analysis of images to determine the actual length of the physical tongue. Accordingly, using the cumulative exposure time to control the length of the digital tongue requires fewer computational resources and/or less computation time, thus allowing for processing of more image and/or depth data to provide a smoother animation to the digital tongue.

Accordingly, the length of the digital tongue may be adjusted, at least in part, based on the cumulative amount of time for which the physical tongue has been exposed. In some implementations, a portion of the total length of the digital tongue (e.g., 25%) may be based on the actual length of the physical tongue, while another portion (e.g., 75%) may be based on the cumulative exposure time. Similarly, in another example, the actual length may be used to determine the appearance of the maximum length of the digital tongue, while the cumulative exposure time may be used to adjust the percentage of this maximum length to which the digital tongue is adjusted. The digital tongue length may thus nevertheless depend on the actual length of the physical tongue, resulting in the digital tongue appearing longer for users with long tongues than for users with short tongues.

In addition or alternative to controlling the length of the digital tongue, the direction in which the digital tongue is extended out of the digital representation of the mouth may be adjusted based on the direction in which the physical tongue is extended out of the user's mouth. In one example, a plurality of landmark locations or features may be identified on and around the lips based on image data representing the user's face. The landmark locations may be used to determine a center of the mouth, about which a coordinate system may be defined.

Additionally, the image and/or depth data may be used to identify a tip of the physical tongue. A vector between the center of the mouth and the tip of the physical tongue may be used to define a direction of the tongue in two dimensions or three dimensions. The digital representation of the face may include a corresponding coordinate system defined about a center of the mouth thereof, thus allowing the direction of the physical tongue to be mimicked by the digital representation by animating the digital tongue to stick out according to the determined vector. Relying on the center of the mouth and the tip of the tongue to determine the direction of the physical tongue may be faster and less computationally-intensive than detecting multiple landmark locations on the physical tongue and adjusting corresponding vertices of the digital tongue to match therewith, while still providing an accurate representation of the direction of the physical tongue. Notably, a length of the vector may also indicate an actual length of the physical tongue.

The direction in which the physical tongue is extended may also be verified or independently determined based on one or more landmark locations that have been occluded by the physical tongue. While the physical tongue is hidden, all landmark locations of the lips might be detectable. However, as the physical tongue is extended, some landmark locations in the direction of the physical tongue's extension may become occluded as the physical tongue comes between the image sensor and the lips and thus makes these occluded landmark locations undetectable. Based on the positions of the remaining unoccluded landmark locations, the expected positions of the occluded landmark locations may nevertheless be determined. These expected positions of the occluded landmarks may be used to determine the direction in which the tongue is extended.

For example, a line or vector of best fit for the occluded landmark locations may be determined that also originates from the center of the mouth. This line or vector of best fit may represent the direction of the tongue, and may approximately match the vector determined by connecting the center of the mouth to the detected tip of the physical tongue. In another example, lines or vectors may be drawn from the center of the mouth through each of the occluded landmark locations to an end of the tongue. The angles at which these lines or vectors are directed may then be averaged or otherwise weighted to identify one overall line or vector that approximates the direction of the physical tongue. The relative positions of the center of the mouth, the occluded landmark locations, and the tip of the physical tongue may be used in other ways and combinations to determine a direction in which the physical tongue is extended out of the user's mouth.

Notably, by using the occluded landmark locations to determine the direction of the tongue, image and/or depth data might not need to be analyzed to identify a tip of the physical tongue. Since the landmark locations of the lips are determined in order to animate the lips of digital representation 400, additional image analysis (aside from detecting whether the physical tongue is exposed or not) might not be needed to determine the direction of the extended physical tongue. Accordingly, using occluded landmark locations to determine the direction of the tongue may be more computationally efficient than other approaches that require additional analysis of images of the extended physical tongue.

The occluded landmark locations may also be used to determine whether the physical tongue is extended (e.g., when one or more landmark locations are occluded) or hidden (e.g., when all landmark locations are detectable or unoccluded). Further, a number or pattern of occluded landmark locations may be used to determine a width of the physical tongue or a conformation of the physical tongue (e.g., rolled tongue). The digital tongue may be adjusted to mimic the physical width and the conformation.

Adjusting the digital tongue to match the direction of the physical tongue may involve determining a combination of tongue expression parameters, each corresponding to a different tongue expression (e.g., direction of extension), that indicate how to blend together the different tongue expressions to generate the desired digital tongue animation that mimics the physical tongue. In one example, the digital tongue may be morphable or adjustable based on five different fundamental tongue expressions, including (i)

tongue extending left, (ii) tongue extending right, (iii) tongue extending up, (iv) tongue extending down, and (v) tongue extending directly out. Notably, the image data may be used to determine the horizontal and vertical components of the direction of the physical tongue while the depth data may be used to determine a depth component of the direction in which the physical tongue is pointed. Accordingly, image data may be used to dictate expressions parameter values corresponding to expressions (i), (ii), (iii), and (iv), while depth data may be used to dictate an expression parameter value correspond to expression (v).

II. Example Computing Device

Referring now to the Figures, FIG. 1 illustrates a simplified block diagram showing some of the components of an example computing device 100. By way of example and without limitation, computing device 100 may be a cellular mobile telephone (e.g., a smartphone), a computer (such as a desktop, notebook, tablet, handheld computer, server computer, or a specialized, purpose-built computer), a personal digital assistant (PDA), a home or business automation component, a digital television, a smartwatch, or some other type of device capable of operating in accordance with the example embodiments described herein. It should be understood that computing device 100 may represent combinations of hardware and software that are configured to carry out the disclosed operations. Computing device 100 may represent the HMD units described herein. In some cases, computing device 100 may be referred to as a computing system.

As shown in FIG. 1, computing device 100 may include communication interface 102, user interface 104, processor(s) 106, data storage 108, camera(s) 124, and depth sensor(s) 126, all of which may be communicatively linked together by a system bus, network, or other connection mechanism 110.

Communication interface 102 may allow computing device 100 to communicate, using analog or digital modulation, with other devices, access networks, and/or transport networks. Thus, communication interface 102 may facilitate circuit-switched and/or packet-switched communication, such as plain old telephone service (POTS) communication and/or Internet protocol (IP) or other packetized communication. For instance, communication interface 102 may include a chipset and antenna arranged for wireless communication with a radio access network or an access point.

Communication interface 102 may take the form of or include a wireline interface, such as an Ethernet, Universal Serial Bus (USB), or High-Definition Multimedia Interface (HDMI) port. Communication interface 102 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 102. Furthermore, communication interface 102 may comprise multiple physical communication interfaces (e.g., a Wi-Fi interface, a BLUETOOTH® interface, and a wide-area wireless interface).

User interface 104 may operate to allow computing device 100 to interact with a user, such as to receive input from the user and to provide output to the user. Thus, user interface 104 may include input components such as a keypad, keyboard, touch-sensitive panel, computer mouse, trackball, joystick, microphone, and so on. User interface 104 may also include one or more output components such as a display screen that, for example, may be combined with a touch-sensitive panel. The display screen may be based on cathode ray tube (CRT), liquid-crystal display (LCD), light-emitting diode (LED) technologies, organic light emitting diode (OLED) technologies, or other technologies now known or later developed. User interface 104 may also be configured to generate audible output(s), via a speaker, speaker jack, audio output port, audio output device, earphones, and/or other similar devices.

In some embodiments, user interface 104 may include one or more buttons, switches, knobs, and/or dials that facilitate interaction with computing device 100. It may be possible that some or all of these buttons, switches, knobs, and/or dials are implemented by way of graphics on a touch-sensitive panel.

Processor(s) 106 may comprise one or more general purpose processors (e.g., microprocessors) or one or more special purpose processors (e.g., digital signal processors (DSPs), graphics processing units (GPUs), floating point units (FPUs), network processors, or application-specific integrated circuits (ASICs)).

Data storage 108 may include one or more volatile and/or non-volatile storage components, such as magnetic, optical, flash, or organic storage, and may be integrated in whole or in part with processor(s) 106. Data storage 108 may include removable and/or non-removable components.

Processor(s) 106 may be capable of executing program instructions 118 (e.g., compiled or non-compiled program logic and/or machine code) stored in data storage 108 to carry out the various operations described herein. Therefore, data storage 108 may include a non-transitory computer-readable medium, having stored thereon program instructions that, upon execution by computing device 100, cause the computing device 100 to carry out any of the methods, processes, or operations disclosed in this specification and/or the accompanying drawings. The execution of program instructions 118 by processor(s) 106 may result in processor(s) 106 using data 112.

By way of example, program instructions 118 may include an operating system 122 (e.g., an operating system kernel, device driver(s), and/or other modules) and one or more application programs 120 (e.g., camera functions, image processing functions, address book, email, web browsing, social networking, and/or gaming applications) installed on computing device 100. Similarly, data 112 may include operating system data 116 and application data 114. Operating system data 116 may be accessible primarily to operating system 122, and application data 114 may be accessible primarily to one or more of application programs 120. Application data 114 may be arranged in a file system that is visible to or hidden from a user of computing device 100.

Application programs 120 may communicate with operating system 122 through one or more application programming interfaces (APIs). These APIs may facilitate, for instance, application programs 120 reading and/or writing application data 114, transmitting or receiving information via communication interface 102, receiving and/or displaying information on user interface 104, and so on.

In some examples, application programs 120 may be referred to as "apps" for short. Additionally, application programs 120 may be downloadable to computing device 100 through one or more online application stores or application markets. However, application programs can also be installed on computing device 100 in other ways, such as via a web browser or through a physical interface (e.g., a USB port) on computing device 100.

Camera(s) 124 may be configured to capture image data (i.e., photo or video) of an environment or scene. The image data may provide a two-dimensional (2D) representation of the environment. The image data may represent the environment or scene in black-and-white, using grayscale pixel values, or in color, using combinations of red, green, and blue pixel color components. To that end, camera(s) 124 may include one or more lenses, one or more image sensors, and one or more color filters. The image sensors may include, for example, charge coupled device (CCD) sensors or complementary metal-oxide-semiconductor (CMOS) sensors. The color filters may include, for example, a Bayer filter. In some cases, a color filter may be omitted entirely, or an image sensor relying on differences in penetration by light of different wavelengths of the material making up the image sensor may be used to detect light of different colors (e.g., FOVEON X3 image sensor).

Depth sensor(s) 126 may be configured to capture depth data of an environment or scene. The depth data may be represented as a 2D image, with an intensity of each pixel representing a distance between the sensor and a corresponding point or feature within the environment. Depth sensor(s) 126 can operate according to a number of different techniques, including stereo triangulation, sheet of light triangulation, structured light, time-of-flight, interferometry, or coded aperture, among other possibilities. Thus, in some implementations, depth sensor(s) 126 may include one or more cameras and one or more light sources, among other components.

It should be understood that the components of the computing device may be distributed, logically or physically, over multiple devices of the same or of a different type. Additionally, multiple computing devices may work in combination to perform the operations described herein.

III. Example HMD Device

Figure 2:
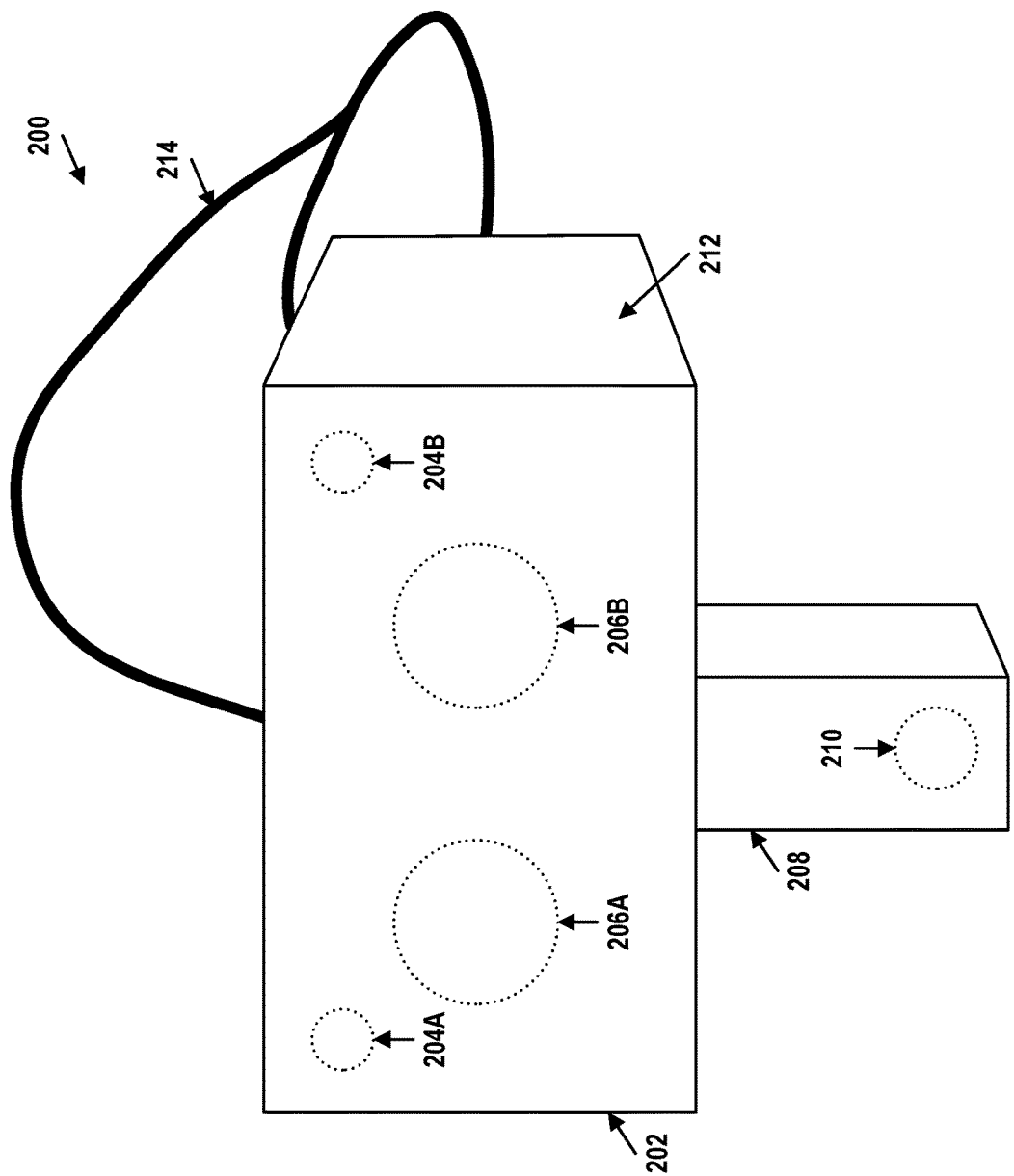
FIG. 2 illustrates a head-mounted display unit, in accordance with example embodiments.

FIG. 2 illustrates an example HMD 200 configured to be worn on a head of a user. HMD 200 represents an example form factor of computing device 100 shown in FIG. 1. HMD 200 includes a body 202 and a vertical extension member 208 extending downwards from body 202. Body 202 includes vision sensors 204A and 204B, displays 206A and 206B, and other sensors (e.g., inertial measurement units (IMUs)). Vertical extension member 208 includes thereon vision sensors 210. HMD 200 may also include straps 214 which allow HMD 200 to be secured to the user's head.

Vertical extension member 208 may be coupled to HMD 200 via a mechanism that allows for adjustment of the vertical position of vision sensor 210 relative to body 202, thereby enabling adjustment of the region of the user's face captured by vision sensor 210. Vision sensor 210 may, for example, be positioned by way of vertical extension member 208 to capture data representing a region around a user's lips and mouth so that a tongue extending out therefrom can be detected and monitored. In some implementations, a member extending horizontally or in a slanted orientation may be used instead of vertical extension member 208 to mount vision sensor 210 to body 202.

Vision sensors 204A, 204B, and 210 may each include a camera (e.g., red-green-blue or infrared) and/or a depth sensor, and may therefore be configured to provide a 3D depth map and/or 2D images (e.g., color or infrared) of the respective regions of the face captured thereby. For example, the depth sensor included in vision sensor 210 may be used to obtain 3D geometry information about lower facial features of the user's face (e.g., mouth, lips, and chin). Alternatively or additionally, a 2D color camera included in vision sensor 210 may be used to capture images of the user's lower facial features. Color images captured by the 2D color camera may be processed by computing device 100 to generate 3D geometry information about lower facial features.

Vision sensors 204A and 204B are included in the upper corners of body 202 to capture respective regions (i.e., left and right eye regions) of a user's face. When HMD 200 is worn on the head of the user, vision sensors 204A and 204B are directed at the user's face. In alternative embodiments, vision sensors 204A and 204B may be placed at side walls 212 of HMD 200. Vision sensors 204A and 204B can also be placed immediately next to displays 206A and 206B.

Displays 206A and 206B may include two distinct display modules: one for displaying left side images to the user's left eye and another for display right side images to the user's right eye. Displays 206A and 206B may be physically separated to match the separation between the user's left and right eyes. Alternatively, in some implementations, a single display module may be divided into two distinct display regions for separately displaying left and right side images.

IV. Example Facial Landmark Detection

Figure 3:
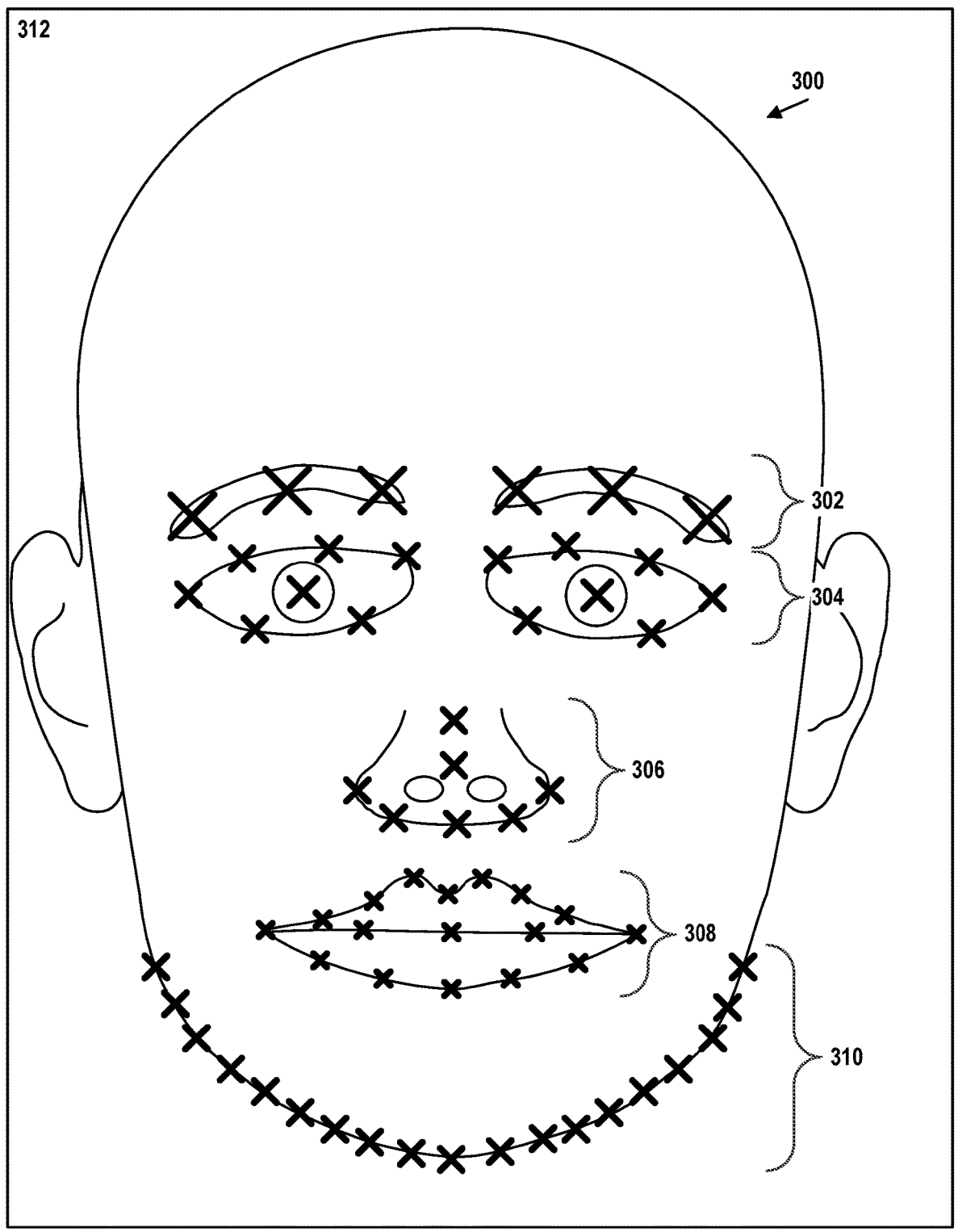
FIG. 3 illustrates landmark features of a face, in accordance with example embodiments.

FIG. 3 illustrates example facial landmarks of face 300. Facial landmarks may be used to match a facial expression of a digital representation of a user's face to the user's actual facial expression, as represented by face 300. Face 300 may be represented in image 312. Image 312 may be processed by a computing device to identify therein eyebrow landmarks 302, eye landmarks 304, nose landmarks 306, lip landmarks 308, chin landmarks 310, and a tip of a tongue (not shown) when the tongue is extended out from the lips, among other landmarks. Processing of image 312 to detect the facial landmarks may involve one or more machine learning, computer vision, or image processing algorithms.

Figure 4:
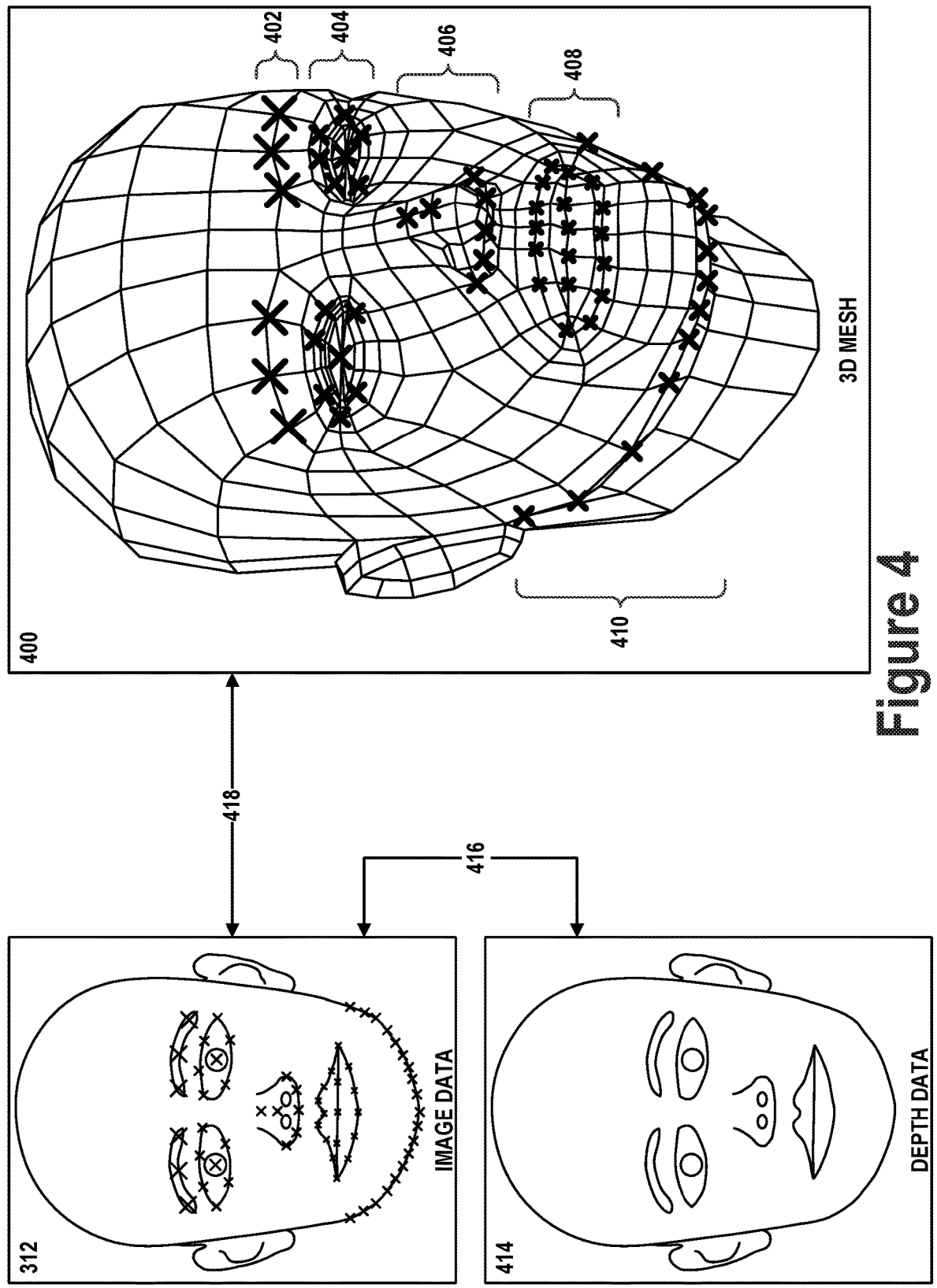
FIG. 4 illustrates landmark features of a face mesh, in accordance with example embodiments.

FIG. 4 illustrates a digital representation 400 of face 300. Digital representation 400 may be a 3D mesh made up of vertices, edges, and faces. Digital representation 400 may be a volumetric mesh or a polygon mesh, for example. However, digital representation 400 could also be another type of computer graphics model. Digital representation 400 may include facial landmarks corresponding to the facial landmarks identified in image 312. That is, digital representation 400 may include eyebrow landmarks 402, eye landmark 404, nose landmarks 406, lip landmarks 408, and chin landmarks 410. Digital representation 400 may also include a digital representation of a tongue (not shown), which may include landmarks such as a tongue tip, and which may be adjusted or animated in accordance with detected movements of a physical tongue associated with face 300 when the physical tongue is exposed outside a mouth of the face.

In addition to being represented by image data 312, face 300 may also be represented by simultaneously-captured depth data 414. Image data 312 and depth data 414 may be spatially aligned, as indicated by arrow 416, thereby representing face 300 in three dimensions. Image data 312 and depth data 414 may be spatially aligned due to having been captured from the same perspective or view point or, alternatively, one of image data 312 or depth data 414 may be transformed or adjusted to spatially match the other. Accordingly, image data 312 and depth data 414 may be used to adjust 3D digital representation 400 to match a user's facial expressions.

Digital representation 400 of the user's head may be represented mathematically by equation (1). In equation (1), R represents a rotation matrix that accounts for the orientation of a user's head, and t represents a translation matrix that accounts for translational movements of the user's head. The values of matrices t and R may be determined based on image data 312, depth data 414, as well as data from other sensors associated with the computing device used to capture the image and depth data (e.g., IMUs). $F(e_i)$ represents an expression of the user's face, which may be determined according to equation (2).

$$W(e_i) = RF(e_i) + t \quad (1)$$

$$F(e_i) = b_0 + \sum_{i}^{n} (b_i - b_0)e_i \quad (2)$$

$$B = \{b_0, b_1, b_2, \ldots, b_n\} \quad (3)$$

In equation (3), B represents a personalized face model which is made up of the user's neutral face expression mesh $b_0$ and a plurality of (non-neutral) face expression meshes $b_1, b_2, \ldots, b_n$ representing different facial expressions such as a smile, a frown, one eye closed, etc. The personalized face model may be determined for each user by way of a calibration procedure described in U.S. Patent Application Publication Number 2017/0091535 which is herein incorporated by reference in its entirety.

The facial expression $F(e_i)$ of digital representation 400 thus represents a superposition of the user's neutral face with a weighted plurality of non-neutral facial expression. Weights $e_i$ determine the overall facial expression of the digital representation by indicating the amount or extent of each of the different facial expressions that is to be included in the overall facial expression $F(e_i)$ of digital representation 400. Weights $e_i$ may therefore be referred to as facial expression parameters. Weights $e_i$ can be determined by reducing or minimizing the energy term represented by equation (4). $E_{OVERALL}$ may be referred to as a cost function, and may be determined iteratively for different candidate weights $e_i$. The candidate weights $e_i$ may be determined using, for example, gradient descent or other optimization algorithms.

$$E_{OVERALL} = E_{LANDMARK} + E_{DEPTH} + E_{REGULARIZATION} \quad (4)$$

In equation (4), the summand $E_{LANDMARK}$ represents the difference between positions of landmark features 302, 304, 306, 308, and 310 in image data 312 and corresponding landmark features 402, 404, 406, 408, and 410 in digital representation 400. That is, since image data 312 represents a user's current facial expression, $E_{LANDMARK}$ represents the difference between positions of landmark features of the user's current facial expression and digital representation 400. $E_{LANDMARK}$ is minimized or reduced below a threshold when positions of landmark features in image data 312 match or approximate positions of landmark features in digital representation 400.

$E_{LANDMARK}$ may be mathematically represented by equation (5). In equation (5), $u_i$ represents the position of a tracked landmark feature in the image data (i.e., the coordinates of landmarks 302, 304, 306, 308, and 310), $v_i$ represents a vertex of the digital representation corresponding to the tracked landmark feature, $\pi(v_i)$ represents a projection of the vertex $v_i$ from the 3D mesh onto the 2D image data, and m is equal to the total number of tracked landmark features. $E_{LANDMARK}$ may be referred to as the landmark energy and the value to which equation (5) evaluates may be referred to as the landmark energy value.

For example, m=21 might represent the topmost landmark of nose landmarks 306/406. Accordingly, $u_{21}$ represents the coordinates within image 312 of the topmost nose landmark and $\pi(v_{21})$ represents the coordinates within image 312 of the topmost nose landmark projected from digital representation 400 onto image 312. When $u_{21}$ and $\pi(v_{21})$ are equal, the position of the topmost nose landmark in image 312 is the same as the 2D position of the topmost nose landmark in digital representation 400.

$$E_{LANDMARK} = \sum_{i}^{m} \|\pi(v_i) - u_i\|_2^2 \quad (5)$$

The summand $E_{DEPTH}$ in equation (4) represents the difference between depths of points along a user's face represented in depth data 414 and in digital representation 400. That is, whereas $E_{LANDMARK}$ allows digital representation 400 to match a user's facial expression along the vertical and horizontal axis, $E_{DEPTH}$ allows representation 400 to match the user's facial expression along the depth axis. $E_{DEPTH}$ is minimized or reduced below a threshold when depths of points along face 300 represented in image data 414 match depths of corresponding vertices in digital representation 400.

$E_{DEPTH}$ may be mathematically represented by equation (6). In equation (6), $v_i$ represents the ith vertex of the digital representation mesh, $z_i$ represents a pixel within the depth data corresponding to $v_i$, $n_i$ represents a surface normal at $v_i$, and k is equal to the total number of pixels along the face represented in the depth data. The correspondence between pixels of depth data 414 and vertices of digital representation 400 is known since depth data 414 is spatially aligned with image 312, as indicated by arrow 416, and image 312 is spatially linked to digital representation 400 by way of the facial landmarks, as indicated by arrow 418. $E_{DEPTH}$ may be referred to as the depth energy and the value to which equation (6) evaluates may be referred to as the depth energy value.

$$E_{DEPTH} = \sum_{i}^{k} [n_i \cdot (v_i - z_i)]^2 \quad (6)$$

The summand $E_{REGULARIZATION}$ in equation (4) represents a sum of weights $e_i$. Each of weights $e_i$ may range from a value of 0 to a value of 1, for example. Minimizing or reducing under a threshold the $E_{REGULARIZATION}$ term allows for suppression of noise in weights $e_i$. For example, when some of weights $e_i$ are very small (e.g., less than 0.01), such weights may be suppressed to 0 without significantly affecting the output facial expression of the digital representation. When such small weights are suppressed to 0, the output facial expression of the digital representation mesh may be rendered without having to include the non-contributing facial expressions in the rendering process, thereby reducing the computational complexity of the rendering process. $E_{REGULARIZATION}$, represented by equation (7), may be referred to as the regularization energy and the value to which equation (7) evaluates may be referred to as the regularization energy value.

$$E_{REGULARIZATION} = \sum_{i}^{n} \|e_i\|^2 \quad (7)$$

Calculating weights $e_i$ to minimize equation (4), or reduce its value under a threshold, based on a single pair of image data 312 and depth data 414 allows for digital representation 400 to be adjusted to match a user's facial expression at one point in time. However, the process of calculating weights $e_i$ may be performed repeatedly over time as additional image data and depth data are generated. Digital representation 400 may thus be adjusted based on a time-varying stream of weights $e_i$ determined based on the additional image and depth data to thereby generate an animated digital representation of the user's face.

V. Example Tongue Length Tracking and Control

In addition to adjusting digital representation 400 to match or mimic the facial expression of face 300, digital representation 400 may additionally be adjusted or animated to match or mimic movements of a tongue of face 300. Digital representation 400 may include a digital representation of a tongue, which may be referred to herein as a digital tongue. The user's actual tongue may be referred to herein as a physical tongue and may be represented by image data and depth data when exposed outside the mouth of face 300. A length of the digital tongue may be adjusted based on an amount of time for which the user's tongue has been exposed outside the user's mouth.

FIG. 5A illustrates an example relationship between an amount of time for which the user's physical tongue has been exposed and a length to which the digital tongue is adjusted. The amount of time for which the physical tongue has been exposed may be a cumulative length of time represented by, for example, an integral over time of whether the physical tongue is exposed or not at predetermined time points. That is, whenever the physical tongue is exposed, as determined based on the image or depth data, a counter may be incremented by a predetermined value. On the other hand, whenever the physical tongue is not exposed, the counter may be decreased by the predetermined value. The counter may take on values ranging from a minimum value corresponding to a fully hidden digital tongue up to a maximum value corresponding to a fully extended digital tongue, with values in therebetween corresponding to varying degrees of exposure of the digital tongue. The counter value may thus indicate (e.g., be proportional to) the cumulative exposure time of the physical tongue.

When the physical tongue has been exposed for zero seconds, the digital tongue might not be extended at all (i.e., 0% digital tongue extension), as illustrated by image 500 which depicts the visual appearance of the digital tongue at 0% extension (i.e., digital tongue not shown). The mouth of digital representation 400 may be shown open, as in image 500, or closed (not shown), depending on whether the mouth of face 300 is open or closed, respectively. When the physical tongue has been exposed for a cumulative 1 second, the digital tongue may be extended one-third of the way from the mouth, as illustrated by image 502 which depicts the visual appearance of the digital tongue (indicated with a cross-hatched pattern) at 33.3% extension. Similarly, when the physical tongue has been exposed for a cumulative 2 seconds, the digital tongue may be extended two-thirds of the way from the mouth, as illustrated by image 504 which depicts the visual appearance of the digital tongue at 66.6% extension. Finally, when the physical tongue has been exposed for a cumulative 3 seconds, the digital tongue may be fully extended from the mouth, as illustrated by image 506 which depicts the visual appearance of the digital tongue at 100% extension.

While FIG. 5A shows 0%, 33.3%. 66.6%, and 100% extension of the digital tongue, the digital tongue may also be adjusted to exhibit various other tongue extension states (i.e., extension percentages) between 0% and 100%, as indicated by the ellipses. For example, digital model may be adjustable to 10, 100, or 1000 different tongue extension states. When more digital tongue extension states are available, animations of changing the length of the tongue may appear smoother due to the difference between adjacent tongue extension states appearing smaller. Notably, exposing the physical tongue for more than a cumulative 3 seconds might not further increase the length of the digital tongue. However, in some embodiments, maximum extension of the digital tongue may correspond to a maximum cumulative time period of exposure of the physical tongue different than 3 seconds. For example, a maximum cumulative time period of 2 seconds might make the digital tongue appear more responsive to exposure of the physical tongue, while a maximum cumulative time period of 5 seconds might make the digital tongue appear less responsive to exposure of the physical tongue. When the maximum cumulative time period is modified, the mapping between physical tongue cumulative exposure time and digital tongue extension percentage may be modified as well to maintain a smooth (e.g., linear) animation of the digital tongue.

FIG. 5B illustrates an example sequence of samples for controlling a length of the digital tongue. In particular, column 1 (i.e., the leftmost column) of FIG. 5B illustrates a sample number and a corresponding time at which the sample is captured. The sample may correspond to image data and/or depth data captured at the corresponding time. The image data and/or depth data may be analyzed by way of one or more computer vision, machine learning, or other algorithms to detect therein an exposed tongue. Column 2 shows the result of such analysis, indicating whether a physical tongue is or is not exposed in corresponding image and/or depth data. Column 3 tracks a cumulative exposure time of the physical tongue. Column 4 (i.e., the rightmost column) indicates an extent to which the digital tongue is extended based on the cumulative extension time of the physical tongue indicated in column 3.

In sample 0, corresponding to 0 seconds, the physical tongue is not detected. Thus, the physical cumulative exposure time, which started at 0, remains unchanged. Similarly, the digital tongue extension remains at 0%. In sample 1, corresponding to 0.5 seconds, the physical tongue is detected. Thus, the physical cumulative exposure time is incremented from 0 seconds by 0.5 seconds to 0.5 seconds. Accordingly, the digital tongue extension increases to 16.6%. The physical tongue continues to be detected in samples 2-5, resulting in the digital tongue growing progressively longer.

Namely, in sample 2, corresponding to 1.0 seconds, the physical tongue is detected. Thus, the physical cumulative exposure time is incremented from 0.5 seconds by 0.5 seconds to 1.0 seconds. Accordingly, the digital tongue extension increases to 33.3%. In sample 3, corresponding to 1.5 seconds, the physical tongue is detected. Thus, the physical cumulative exposure time is incremented from 1.0 seconds by 0.5 seconds to 1.5 seconds. Accordingly, the digital tongue extension increases to 50.0%. In sample 4, corresponding to 2.0 seconds, the physical tongue is detected. Thus, the physical cumulative exposure time is incremented from 1.5 seconds by 0.5 seconds to 2.0 seconds. Accordingly, the digital tongue extension increases to 66.6%. In sample 5, corresponding to 2.5 seconds, the physical tongue is detected. Thus, the physical cumulative exposure time is incremented from 2.0 seconds by 0.5 seconds to 2.5 seconds. Accordingly, the digital tongue extension increases to 83.3%.

However, in sample 6, corresponding to 3.0 seconds, the physical tongue is not detected. Thus, the physical cumulative exposure time is decreased from 2.5 seconds by 0.5 seconds to 2.0 seconds. Accordingly, the digital tongue extension decreases to 66.6%. Similarly, in sample 7, corresponding to 3.5 seconds, the physical tongue is not detected. Thus, the physical cumulative exposure time is decreased from 2.0 seconds by 0.5 seconds to 1.5 seconds. Accordingly, the digital tongue extension decreases to 50.0%. When the physical tongue is again exposed and detected in samples 8-11, the digital tongue again grows progressively longer up to the maximum length.

Namely, in sample 8, corresponding to 4.0 seconds, the physical tongue is detected. Thus, the physical cumulative exposure time is incremented from 1.5 seconds by 0.5 seconds to 2.0 seconds. Accordingly, the digital tongue extension increases to 66.6%. In sample 9, corresponding to 4.5 seconds, the physical tongue is detected. Thus, the physical cumulative exposure time is incremented from 2.0 seconds by 0.5 seconds to 2.5 seconds. Accordingly, the digital tongue extension increases to 83.3%. In sample 10, corresponding to 5.0 seconds, the physical tongue is detected. Thus, the physical cumulative exposure time is incremented from 2.5 seconds by 0.5 seconds to 3.0 seconds. Accordingly, the digital tongue extension increases to 100.0%. In sample 11, corresponding to 5.5 seconds, the physical tongue is detected. However, since the physical cumulative exposure time is already at its maximum value of 3.0 seconds, it remains unchanged. Accordingly, the digital tongue extension remains at 100.0%.

In sample 12, corresponding to 6.0 seconds, the physical tongue is again not detected. Thus, the physical cumulative exposure time is decreased from 3.0 seconds by 0.5 seconds to 2.5 seconds. Accordingly, the digital tongue extension decreases to 83.3%. In sample 13, corresponding to 6.5 seconds, the physical tongue is not detected. Thus, the physical cumulative exposure time is decreased from 2.5 seconds by 0.5 seconds to 2.0 seconds. Accordingly, the digital tongue extension decreases to 66.6%. In sample 14, corresponding to 7.0 seconds, the physical tongue is not detected. Thus, the physical cumulative exposure time is decreased from 2.0 seconds by 0.5 seconds to 1.5 seconds. Accordingly, the digital tongue extension decreases to 50.0%. In sample 15, corresponding to 7.5 seconds, the physical tongue is not detected. Thus, the physical cumulative exposure time is decreased from 1.5 seconds by 0.5 seconds to 1.0 seconds. Accordingly, the digital tongue extension decreases to 33.3%. In sample 16, corresponding to 8.0 seconds, the physical tongue is not detected. Thus, the physical cumulative exposure time is decreased from 1.0 seconds by 0.5 seconds to 0.5 seconds. Accordingly, the digital tongue extension decreases to 16.6%. In sample 17, corresponding to 8.5 seconds, the physical tongue is not detected. Thus, the physical cumulative exposure time is decreased from 0.5 seconds by 0.5 seconds to 0 seconds. Accordingly, the digital tongue extension decreases to 0%.

In sample 18, corresponding to 9.0 seconds, the physical tongue is not detected. However, since the physical cumulative exposure time is already at its minimum value of 0 seconds, it remains unchanged. Accordingly, the digital tongue extension remains at 0%.

As illustrated by FIG. 5B, whether the physical tongue is exposed or hidden may be evaluated periodically. For example, an image frame or a depth frame may be selected and evaluated at predetermined time points, which may be separated by a uniform or non-uniform time interval. In some implementations, each available image frame and/or depth frame may be analyzed to determine whether the physical tongue is exposed. Alternatively, every N image frames (e.g., N=1, 2, 3, . . . ) or M depth frames (e.g., M=1, 2, 3, . . . ) may be analyzed to determine whether the physical tongue is exposed. Since image and depth frames may be generated at predetermined rates, the predetermined time points at which tongue exposure is detected may be based on the respective frame rates of the sensors. The amount of time added to the physical tongue cumulative exposure counter may depend on the frequency with which the image sensor and/or the depth sensor generate data. For example, the amount by which the physical tongue cumulative exposure counter is increased or decreased may be inversely proportional to the frame rates of the sensors (e.g., where each image or depth frame is analyzed for tongue exposure).

VI. Example Tongue Direction Tracking and Control

The digital tongue of digital representation 400 may be adjusted or animated to mimic the direction in which the physical tongue (e.g., the tip thereof) is extended out of the mouth. The direction in which the digital tongue is extended may be adjusted in combination with controlling the length of the digital tongue. That is, cumulative exposure time may control a length of the tongue while the tongue extends in a direction dictated by the physical tongue. Alternatively, tongue direction may be controlled independently of controlling a length of the tongue. For example, a digital tongue of a fixed length may be extended in a direction dictated by the physical tongue every time the physical tongue is detected to be extended.

Figure 6A:
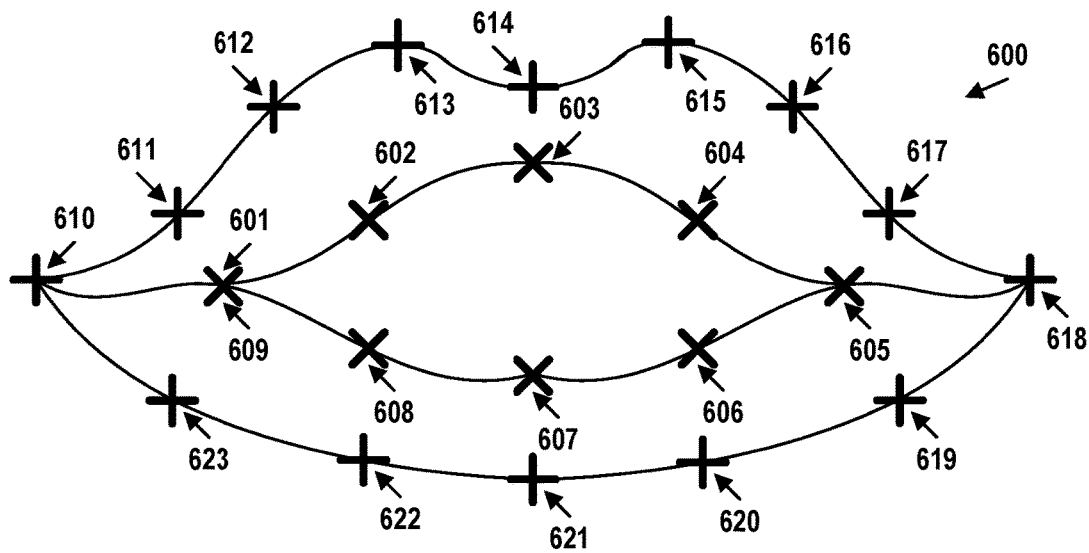
FIG. 6A illustrates landmark features of lips, in accordance with example embodiments.

FIGS. 6A, 6B, 6C, and 6D illustrate example operations for determining a direction in which a physical tongue is extended. FIG. 6A illustrates a plurality of landmark locations or features detected on lips 600 of face 300. Lips 600 may include thereon landmark locations 610, 611, 612, 613, 614, 615, 616, 617, 618, 619, 620, 621, 622, and 623 (i.e., landmark locations 610-623) delineating the outside contour of lips 600. When lips 600 are open, lips 600 may additionally include thereon landmark location 601, 602, 603, 604, 605, 606, 607, 608, and 609 (i.e., landmark locations 601-609) delineating the inside contour of lips 600. When lips 600 are closed, landmark locations 601-609 may be repositioned accordingly or consolidated into a smaller number of landmark locations. Landmark locations 601-609 and 610-623 may be detected within image data representing lips 600 using one or more computer vision, machine learning, artificial intelligence, or other image processing algorithms. In some implementations, each of landmark locations 601-609 and 610-623 may also be associated with a corresponding depth value determined based on data from the depth sensor.

Figure 6B:
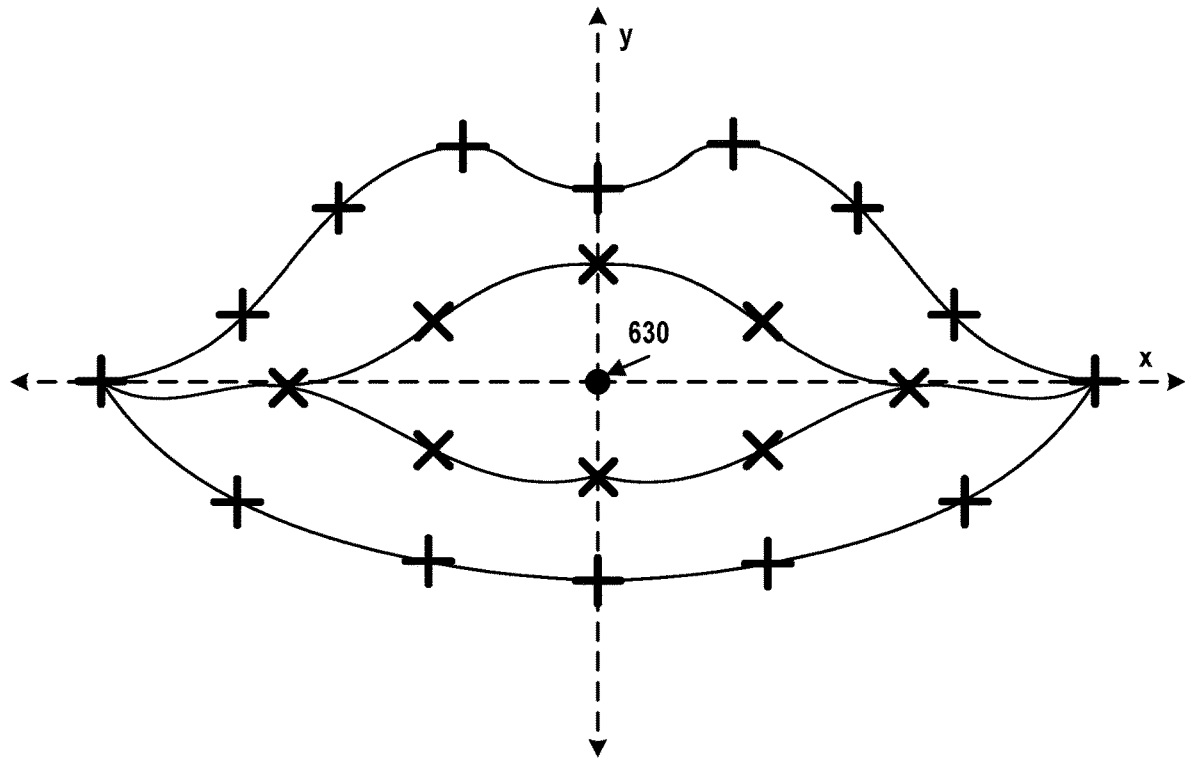
FIG. 6B illustrates a coordinate system, in accordance with example embodiments.

When the physical tongue does not extend out of lips 600, landmark locations 601-609 and 610-623 may be used to identify a center 630 of lips 600 or the mouth associated therewith, as illustrated by FIG. 6B. Center 630 may be determined, for example, by determining an average of the coordinates of each of landmark locations 601-609 and 610-623, or by projecting lines through different combinations of landmark locations 601-609 and 610-623, among other possibilities. A coordinate system (e.g., a Cartesian xy-coordinate system, a Cartesian xyz-coordinate system, two-dimensional polar coordinate system, three-dimensional polar coordinate system, etc.) may be centered about center 630 to be used for locating a tip of the tongue relative to the mouth. A y-axis (i.e., a vertical axis) of the coordinate system may be aligned with or near landmark locations 614, 603, 607, and 621 using, for example, a least squares regression. Similarly, an x-axis (i.e., a horizontal axis) of the coordinate system may be aligned with or near landmark locations 610, 601, 605, and 618. In some implementations, the coordinate system may additionally include a z-axis (i.e., a depth axis extending out of and into the page) orthogonal to the x-axis and the y-axis.

Figure 6C:
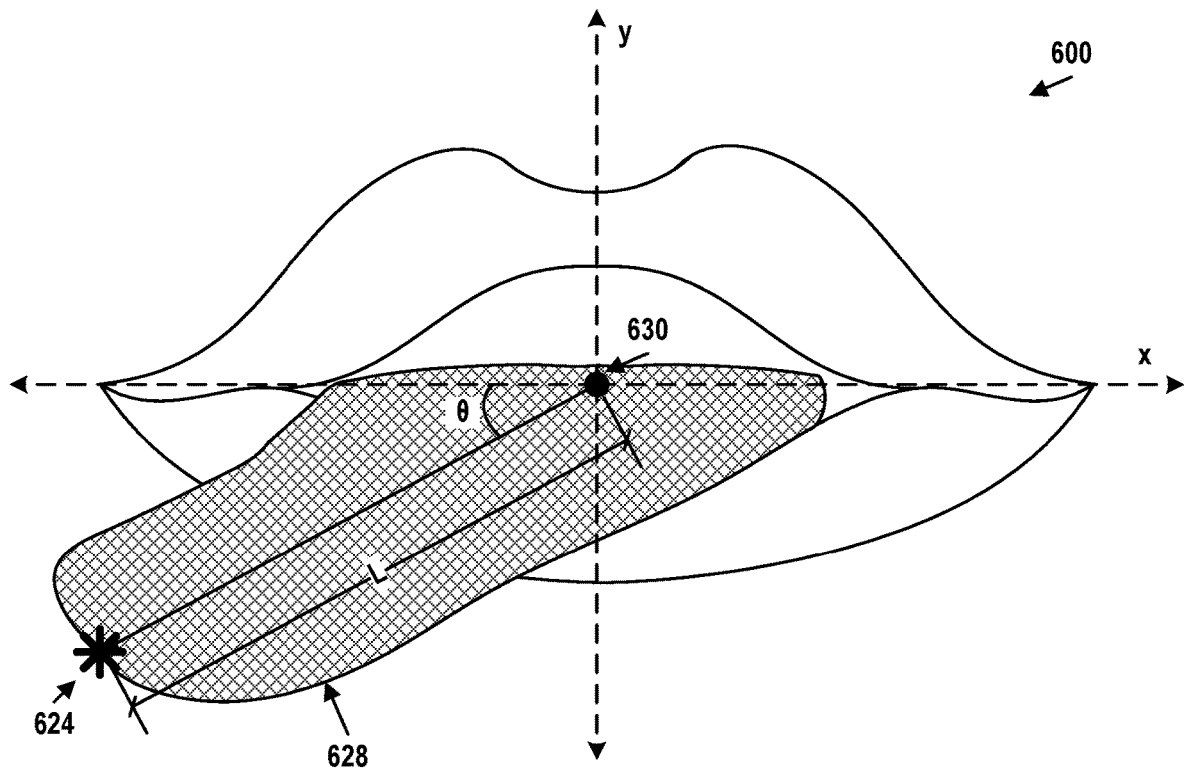
FIG. 6C illustrates a tongue tip, in accordance with example embodiments.

When physical tongue 628 is detected extending outside of the mouth, as illustrated in FIG. 6C, tip 624 of physical tongue 628 may be detected based on image and/or depth data. For example, the depth data may be used to identify tip 624 as the point farthest away from the face along the z-axis. Tip 624 of physical tongue 628 may be localized relative to the coordinate system. For example, exact coordinates of tip 624 in the coordinate system and/or a quadrant of the coordinate system (e.g., lower left quadrant, as shown) in which tip 624 is located may be determined. Additionally, an angle between tip 624 and the x-axis, the y-axis, and/or the z-axis may be determined. For example, as shown, tip 624 is positioned left of the y-axis at an angle θ below the negative (left-pointing) x-axis. Angle θ may alternatively be measured relative to the y-axis or relative to the positive (right-pointing) x-axis, among other possibilities.

Digital representation 400 may include a corresponding coordinate system originating or positioned at a center of a mouth of digital representation 400. Accordingly, determining a position of tip 624 of physical tongue 628 allows the digital tongue to be modulated to point the tip thereof in the same or similar direction or position the tip thereof at the same or similar coordinates as physical tongue 628. Monitoring physical tongue 628 and tip 624 thereof over time allows the digital tongue to be animated to mimic any changes in the position or direction of tip 624 of physical tongue 628.

Figure 6D:
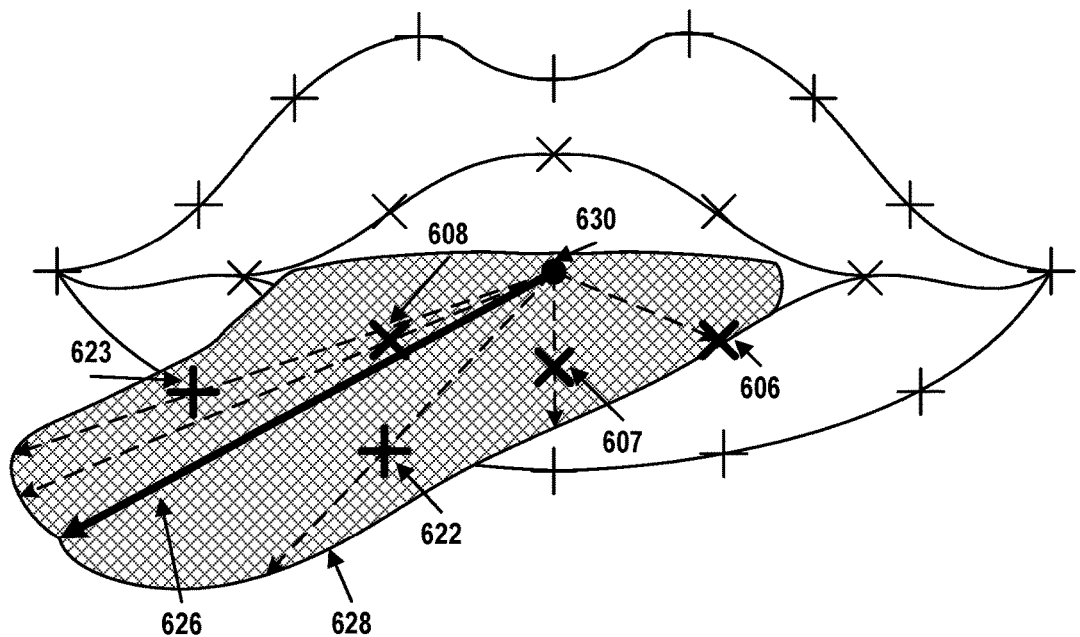
FIG. 6D illustrates occluded landmark features, in accordance with example embodiments.

FIG. 6D illustrates another approach that may be used additionally or alternatively to determine the direction in which physical tongue 628 is pointed. When physical tongue 628 is extended out of the mouth, some of landmark locations 601-609 and 610-623 may become occluded by physical tongue 628. The position of these occluded landmark locations may be used to determine the direction of physical tongue 628. For example, as shown in FIG. 6D, when physical tongue 628 is extended out in the same manner as in FIG. 6C, landmark locations 623, 622, 608, 607, and 606 are occluded. Notably, occluded landmark locations 623, 622, 608, 607, and 606 are shown bolded, while the remaining landmark features are shown with a lighter line weight.

Occluded landmark locations 623, 622, 608, 607, and 606, although they might not be detectable due to occlusion by physical tongue 628, may each be associated with an expected or predicted position along lips 600. The expected position of each of occluded landmark location 623, 622, 608, 607, and 606 may be determined based on the positions of the remaining unoccluded landmark locations. These expected positions may be used to determine the direction in which physical tongue 628 is pointed. For example, a line may be drawn from center 630, through the expected position of each occluded landmark location, to an end of physical tongue 628, as shown in FIG. 6D. The angles at which each of the lines is drawn may be averaged to determine line 626 as a line that bisects or runs along the middle of physical tongue 628, and thus represents the direction in which physical tongue 628 is pointed. In some cases, the length of each line may be used to weigh how much each line's angle contributes to the overall angle of line 626, with longer lines contributing more than shorter lines. In yet other cases, line 626 may be determined using a least squares regression with the constraint that the line starts at center 630. Other approaches and variations for determining line 626 are possible.

Occluded landmark locations 623, 622, 608, 607, and 606 may be used to determine the direction of physical tongue 628 in combination with the tongue tip detection approach discussed with respect to FIG. 6C. For example, occluded landmark locations 623, 622, 608, 607, and 606 may be used to verify that tip 624 has been detected within the same quadrant as line 626 or that angle θ matches (e.g., is within a threshold number of degrees relative to) a corresponding angle of line 626, among other possibilities. Using occluded landmarks in this way may allow for any erratic or high-frequency variations in the detected position of tip 624 to be suppressed (e.g. an erroneously-determined position of tip 624 may be ignored when it does not fall within a threshold distance of the tip of line 626), thus making the animation of the digital tongue appear smoother. However, occluded landmark locations 623, 622, 608, 607, and 606 may also be used to determine the direction of physical tongue 628 independently of the approach discussed with respect to FIG. 6C. In general however, the direction of physical tongue 628 may be determined based on any combination of relative positions and orientations of center 630, tip 624, landmark locations 623, 622, 608, 607, and 606 (or any other occluded landmark locations), and line 626.

Occlusion of one or more landmark locations may additionally be used to determine whether physical tongue 628 is exposed or hidden inside the mouth. For example, when one or more landmark locations become occluded, physical tongue 628 may be determined to be exposed. Detection of occluded landmarks may thus also be used to indirectly control the length of the digital tongue by dictating whether to increase or decrease the cumulative exposure time counter of physical tongue 628.

The positions of any occluded landmarks may also be used in some implementations to control a width of the digital tongue. A narrow physical tongue, for example, might cover fewer landmark locations than a wide physical tongue when both tongues are extended outside the mouth by a same length. Thus, a width of the digital tongue may be proportional to a number of landmark locations 601-609 and/or landmark location 610-623 that are occluded. Further, in some implementations, a conformation of the digital tongue (i.e., a shape into which a tongue is arranged from its neutral or flat position) may be controlled based on the pattern of occluded landmark locations. A rolled tongue, for example, might result in landmark locations 602, 604, 613, and 615 being occluded, but all the remaining landmark locations, including landmark locations 614, and 603, remaining unoccluded. Other tongue conformations may be associated with other corresponding occlusion patterns.

In some implementations, in addition to controlling the length of the digital tongue based on a cumulative exposure time of physical tongue 628, the length of the digital tongue may also be based on an actual length of physical tongue 628. Thus, a digital expression of a user with a long physical tongue may have a longer digital tongue than a digital expression of a user with a short physical tongue. The actual length of physical tongue 628 may be based on a distance L between center 630 and tongue tip 624 within corresponding image and depth data. Distance L may represent the length of a two-dimensional or three-dimensional vector extending from center 630 to tip 624. Alternatively or additionally, the actual length of physical tongue 628 may be based on a length of line 626.

In one example, a first portion of the total length (e.g., 40%) of the digital tongue may be determine by the actual length of physical tongue 628, while a second portion of the total length (e.g., 60%) of the digital tongue may be determined by the cumulative exposure time of physical tongue 628. In another example, the actual length of physical tongue 628 (e.g., a maximum detected length thereof) may be used to determine how long the digital tongue appears at maximum extension, while the cumulative exposure time of physical tongue 628 may determine the fraction of the maximum extension that the digital tongue is adjusted to. Notably, the cumulative exposure time, which depends on a binary analysis of tongue presence (e.g., tongue exposed vs tongue hidden), may exhibit fewer high frequency changes than the determined actual length of physical tongue 628, which depends on a more analog analysis of tongue positioning (e.g., image analysis to determine a length). Accordingly, using the cumulative exposure time to control, at least in part, the length of the digital tongue may result in a smoother animation of the digital tongue than using the actual physical tongue length alone.

The direction of the digital tongue may be controlled to mimic movements of physical tongue 628 with varying degrees of granularity. That is, the digital tongue may be positioned along a varying number of discrete positions or directions. For example, as illustrated in FIG. 7, the digital tongue may be pointed up along the positive y-axis, as indicated by digital tongue expression 700, down along the negative y-axis, as indicated by digital tongue expression 702, right along the positive x-axis, as indicated by digital tongue expression 706, left along the negative x-axis, as indicated by digital tongue expression 704, or out of the page along the positive z-axis, as indicated by digital tongue expression 708, depending on the direction of tip 624 of physical tongue 628 and/or line 626 therealong. A closest one of these expressions may be selected based on the direction of tip 624 or line 626.

In other embodiments, the digital tongue may also be pointed in various additional directions between those shown in expressions 700-708. For example, additional expressions may be provided that point the digital tongue along these various additional directions, with the closest one of these various additional directions being selected based on the determined direction of the physical tongue. Alternatively, expressions 700-708 may be blended, morphed, or otherwise combined together in different amounts into an overall digital tongue expression or shape to mimic or approximate the determined direction of the physical tongue. To that end, each of expressions 700-708 may be associated with an expression parameter ranging in value between a corresponding minimum and maximum value. A minimum value of the expression parameter may indicate that the corresponding expression is not present in the overall digital tongue expression, while a maximum value may indicate that the corresponding expression is fully present in the overall digital tongue expression.

Different combinations of expression parameters may thus animate the digital tongue to be pointed in a wide range of different directions in two-dimensions or three-dimensions. The expression parameters of expressions 700 and 702 may control a vertical component of a position of the digital tongue and the tip thereof, the expression parameters of expressions 704 and 706 may control a horizontal position of the digital tongue and the tip thereof, and the expression parameter of expression 708 may control a depth of the digital tongue and the tip thereof. Notably, as described above, a length of the overall digital tongue expressions may be adjusted based on the cumulative length of time for which the physical tongue has been exposed regardless of the direction in which the overall digital tongue expression is extended or pointed.

VII. Additional Example Operations

Figure 8:
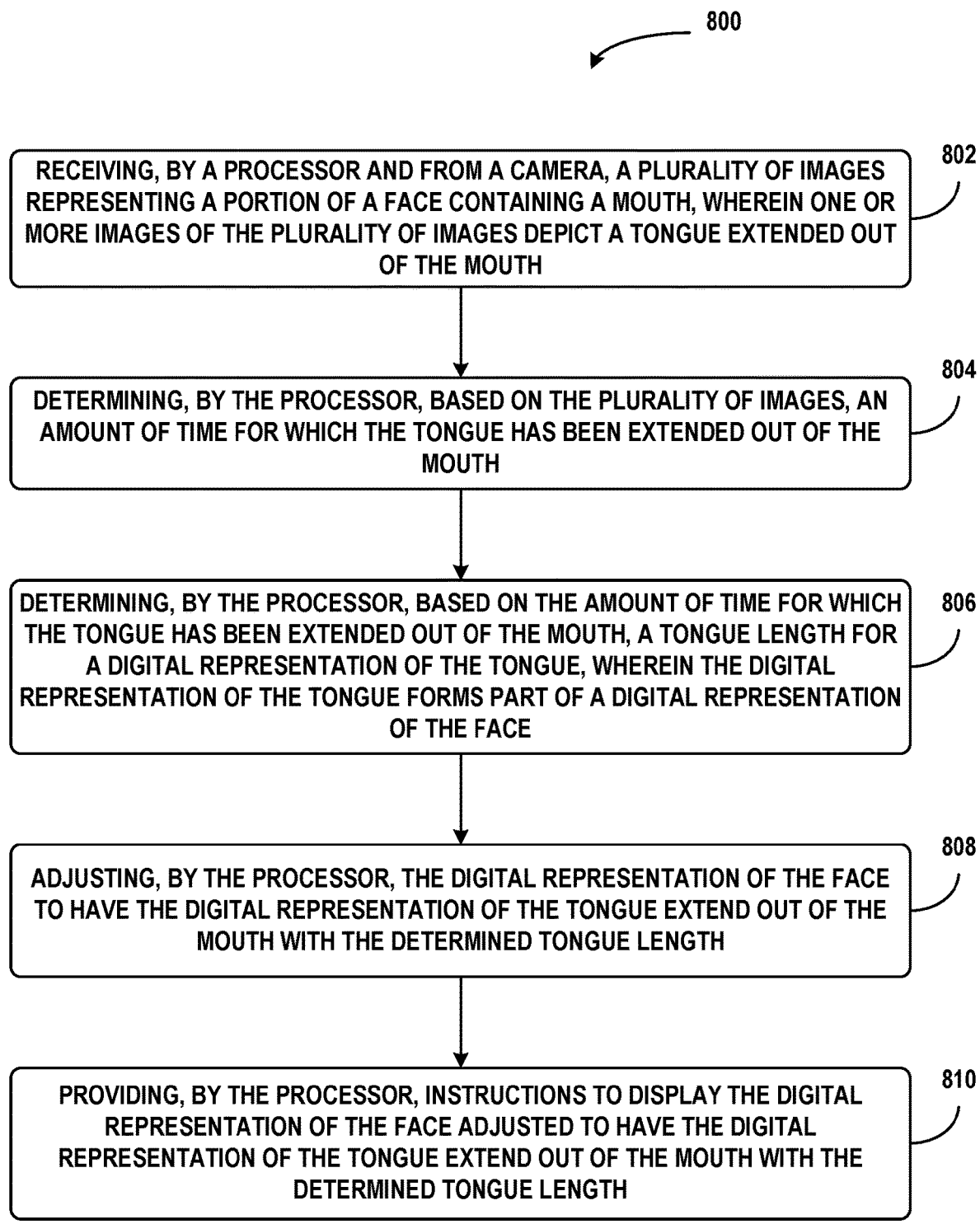
FIG. 8 illustrates a flow chart, in accordance with example embodiments.

FIG. 8 illustrates flow chart 800 of example operations related to tongue tracking. These operations may be executed by, for example, computing device 100. In general, the operations of flow chart 800, as well as any other operations herein described, may be performed by any computing device connected to or equipped with a camera (e.g., a red-green-blue camera) and/or a depth sensor. The computing device executing these operations may be implemented in a plurality of form factors such as, for example, a phone, a tablet, an HMD, a laptop, a television, or a watch, among other possibilities.

Block 802 involves, receiving, by a processor and from a camera, a plurality of images representing a portion of a face containing a mouth. One or more images of the plurality of images depict a tongue extended out of the mouth.

Block 804 involves determining, by the processor, based on the plurality of images, an amount of time for which the tongue has been extended out of the mouth.

Block 806 involves determining, by the processor, based on the amount of time for which the tongue has been extended out of the mouth, a tongue length for a digital representation of the tongue. The digital representation of the tongue forms part of a digital representation of the face.

Block 808 involves adjusting, by the processor, the digital representation of the face to have the digital representation of the tongue extend out of the mouth with the determined tongue length.

Block 810 involves providing, by the processor, instructions to display the digital representation of the face adjusted to have the digital representation of the tongue extend out of the mouth with the determined tongue length.

In some embodiments, determining the amount of time for which the tongue has been extended out of the mouth may include, for each image of the one or more images that depict the tongue extended out of the mouth, increasing a counter value by a predetermined amount. The counter value may be increasable up to a maximum value. Determining the amount of time for which the tongue has been extended out of the mouth may also include, for each image of the plurality of images that do not depict the tongue extended out of the mouth, decreasing the counter value by the predetermined amount. The counter value may be decreasable down to a minimum value.

In some embodiments, determining the tongue length for a digital representation of the tongue may include determining the tongue length based on the counter value. The tongue length may be proportional to the counter value. The maximum value may correspond to the tongue fully extended out of the mouth. The minimum value may correspond to the tongue fully hidden inside the mouth.

In some embodiments, the plurality of images may be captured by a camera having a first frame rate. The predetermined amount may be inversely proportional to the first frame rate.

In some embodiments, a direction in which the tongue is extended out of the mouth within the one or more images may be determined by the processor. The digital representation of the face may be adjusted by the processor to have the digital representation of the tongue extend out of the mouth in the determined direction. Instructions to display the digital representation of the face adjusted to have the digital representation of the tongue extend out of the mouth in the determined direction may be provided by the processor.

In some embodiments, determining the direction in which the tongue is extended out of the mouth may include detecting, within the plurality of images, a plurality of landmark locations corresponding to lips of the face. Based on the plurality of landmark locations corresponding to the lips, a center of the mouth may be determined. Based on the one or more images that depict the tongue extended out of the mouth, a tip of the tongue may be identified. The direction in which the tongue is extended out of the mouth may be determined based on a position of the tip of the tongue relative to the center of the mouth.

In some embodiments, determining the direction in which the tongue is extended out of the mouth may involve detecting, within an image of the plurality of images that does not depict the tongue extended out of the mouth, a plurality of landmark locations corresponding to lips of the face. Based the one or more images that depict the tongue extended out of the mouth, one or more occluded landmark locations of the plurality of landmark locations may be identified. The occluded landmark locations may be occluded by the tongue. The direction in which the tongue is extended out of the mouth may be determined based on a position of the one or more occluded landmark locations.

In some embodiments, determining the direction in which the tongue is extended out of the mouth based on a position of the one or more occluded landmark locations may include, based on the plurality of landmark locations corresponding to the lips, determining a center of the mouth. The direction in which the tongue is extended out of the mouth may be determined based on a position of the one or more occluded landmark locations relative to the center of the mouth.

In some embodiments, determining the direction in which the tongue is extended out of the mouth based on a position of the one or more occluded landmark locations may include, based on the one or more images depicting the tongue extended out of the mouth, identifying a tip of the tongue. The direction in which the tongue is extended out of the mouth may be determined based on a position of the tip of the tongue relative to a position of the one or more occluded landmark locations.

In some embodiments, adjusting the digital representation of the face to have the digital representation of the tongue extend out of the mouth in the determined direction may include, based on the direction in which the tongue is extended out of the mouth, determining (i) a first value of a first expression parameter corresponding to a first expression with a tongue sticking out in a left direction, (ii) a second value of a second expression parameter corresponding to a second expression with a tongue sticking out in a right direction, (iii) a third value of a third expression parameter corresponding to a third expression with a tongue sticking out in an upward direction, and (iv) a fourth value of a fourth expression parameter corresponding to a fourth expression with a tongue sticking out in a downward direction. Based on the first value, the second value, the third value, and the fourth value, a combination of the first expression, the second expression, the third expression, and the fourth expression may be determined according to which to adjust the digital representation of the tongue In some embodiments, depth data representing the portion of the face containing the mouth may be received from a depth sensor. The depth data may represent the tongue extended out of the mouth. Based on the one or more images, (i) a horizontal component of the direction in which the tongue is extended out of the mouth and (ii) a vertical component of the direction in which the tongue is extended out of the mouth may be determined. Based on the depth data, a depth component of the direction in which the tongue is extended out of the mouth may be determined.

In some embodiments, depth data representing the portion of a face containing the mouth may be received from a depth sensor. The depth data may represent the tongue extended out of the mouth. The tongue length for the digital representation of the tongue may be determined further based on the depth data.

In some embodiments, a plurality of landmark locations corresponding to lips of the face may be detected within an image of the plurality of images that does not depict the tongue extended out of the mouth. One or more landmark locations of the plurality of landmark locations that are occluded by the tongue may be identified based the one or more images that depict the tongue extended out of the mouth. Based on the one or more landmark locations being occluded by the tongue, it may be determined that the tongue is extended out of the mouth.

In some embodiments, a plurality of landmark locations corresponding to lips of the face may be detected within the plurality of images. Based on the plurality of landmark locations corresponding to the lips, a center of the mouth may be determined. Based on the one or more images that depict the tongue extended out of the mouth, a tip of the tongue may be identified. The tongue length for the digital representation of the tongue may be determined further based on a distance between the tip of the tongue and the center of the mouth.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    receiving, by a processor and from a camera, a plurality of images representing a portion of a face containing a mouth, wherein one or more images of the plurality of images depict a tongue extended out of the mouth;
    determining, by the processor, based on the plurality of images, an amount of time for which the tongue has been extended out of the mouth;
    determining, by the processor based on the amount of time for which the tongue has been extended out of the mouth, a tongue length for a digital representation of the tongue, wherein the digital representation of the tongue forms part of a digital representation of the face, and wherein the tongue length is proportional to the amount of time;
    adjusting, by the processor, the digital representation of the face to have the digital representation of the tongue extend out of the mouth with the determined tongue length; and
    providing, by the processor, instructions to display the digital representation of the face adjusted to have the digital representation of the tongue extend out of the mouth with the determined tongue length.

2. The method of claim 1, wherein determining the amount of time for which the tongue has been extended out of the mouth comprises:
    for each image of the one or more images that depict the tongue extended out of the mouth, increasing a counter value by a predetermined amount, wherein the counter value is increasable up to a maximum value; and
    for each image of the plurality of images that do not depict the tongue extended out of the mouth, decreasing the counter value by the predetermined amount, wherein the counter value is decreasable down to a minimum value.

3. The method of claim 2, wherein determining the tongue length for a digital representation of the tongue comprises:
    determining the tongue length based on the counter value, wherein the tongue length is proportional to the counter value, wherein the maximum value corresponds to the tongue fully extended out of the mouth, and wherein the minimum value corresponds to the tongue fully hidden inside the mouth.

4. The method of claim 2, wherein the plurality of images is captured by a camera having a first frame rate, and wherein the predetermined amount is inversely proportional to the first frame rate.

5. The method of claim 1, further comprising:
    determining, by the processor, a direction in which the tongue is extended out of the mouth within the one or more images;
    adjusting, by the processor, the digital representation of the face to have the digital representation of the tongue extend out of the mouth in the determined direction; and
    providing, by the processor, instructions to display the digital representation of the face adjusted to have the digital representation of the tongue extend out of the mouth in the determined direction.

6. The method of claim 5, wherein determining the direction in which the tongue is extended out of the mouth comprises:
    detecting, within the plurality of images, a plurality of landmark locations corresponding to lips of the face;
    based on the plurality of landmark locations corresponding to the lips, determining a center of the mouth;
    based on the one or more images that depict the tongue extended out of the mouth, identifying a tip of the tongue; and
    determining the direction in which the tongue is extended out of the mouth based on a position of the tip of the tongue relative to the center of the mouth.

7. The method of claim 5, wherein determining the direction in which the tongue is extended out of the mouth comprises:
    detecting, within an image of the plurality of images that does not depict the tongue extended out of the mouth, a plurality of landmark locations corresponding to lips of the face;
    identifying, based the one or more images that depict the tongue extended out of the mouth, one or more occluded landmark locations of the plurality of landmark locations, wherein the occluded landmark locations are occluded by the tongue; and
    determining the direction in which the tongue is extended out of the mouth based on a position of the one or more occluded landmark locations.

8. The method of claim 7, wherein determining the direction in which the tongue is extended out of the mouth based on a position of the one or more occluded landmark locations further comprises:
based on the plurality of landmark locations corresponding to the lips, determining a center of the mouth; and
determining the direction in which the tongue is extended out of the mouth based on a position of the one or more occluded landmark locations relative to the center of the mouth.

9. The method of claim 7, wherein determining the direction in which the tongue is extended out of the mouth based on a position of the one or more occluded landmark locations further comprises:
based on the one or more images depicting the tongue extended out of the mouth, identifying a tip of the tongue; and
determining the direction in which the tongue is extended out of the mouth based on a position of the tip of the tongue relative to a position of the one or more occluded landmark locations.

10. The method of claim 5, wherein adjusting the digital representation of the face to have the digital representation of the tongue extend out of the mouth in the determined direction comprises:
based on the direction in which the tongue is extended out of the mouth, determining (i) a first value of a first expression parameter corresponding to a first expression with a tongue sticking out in a left direction, (ii) a second value of a second expression parameter corresponding to a second expression with a tongue sticking out in a right direction, (iii) a third value of a third expression parameter corresponding to a third expression with a tongue sticking out in an upward direction, and (iv) a fourth value of a fourth expression parameter corresponding to a fourth expression with a tongue sticking out in a downward direction; and
based on the first value, the second value, the third value, and the fourth value, determining a combination of the first expression, the second expression, the third expression, and the fourth expression according to which to adjust the digital representation of the tongue.

11. The method of claim 5, further comprising:
receiving, from a depth sensor, depth data representing the portion of the face containing the mouth, wherein the depth data represents the tongue extended out of the mouth; and
determining, based on the one or more images, (i) a horizontal component of the direction in which the tongue is extended out of the mouth and (ii) a vertical component of the direction in which the tongue is extended out of the mouth; and
determining, based on the depth data, a depth component of the direction in which the tongue is extended out of the mouth.

12. The method of claim 1, further comprising:
receiving, from a depth sensor, depth data representing the portion of a face containing the mouth, wherein the depth data represents the tongue extended out of the mouth; and
determining the tongue length for the digital representation of the tongue further based on the depth data.

13. The method of claim 1, further comprising:
detecting, within an image of the plurality of images that does not depict the tongue extended out of the mouth, a plurality of landmark locations corresponding to lips of the face;

identifying, based the one or more images that depict the tongue extended out of the mouth, one or more landmark locations of the plurality of landmark locations that are occluded by the tongue; and
based on the one or more landmark locations being occluded by the tongue, determining that the tongue is extended out of the mouth.

14. The method of claim 1, further comprising:
detecting, within the plurality of images, a plurality of landmark locations corresponding to lips of the face;
based on the plurality of landmark locations corresponding to the lips, determining a center of the mouth;
based on the one or more images that depict the tongue extended out of the mouth, identifying a tip of the tongue; and
determining the tongue length for the digital representation of the tongue further based on a distance between the tip of the tongue and the center of the mouth.

15. A system comprising:
a camera;
a display; and
computing hardware configured to:
receive, from the camera, a plurality of images representing a portion of a face containing a mouth, wherein one or more images of the plurality of images depict a tongue extended out of the mouth;
determine, based on the plurality of images, an amount of time for which the tongue has been extended out of the mouth;
determine, based on the amount of time for which the tongue has been extended out of the mouth, a tongue length for a digital representation of the tongue, wherein the digital representation of the tongue forms part of a digital representation of the face, and wherein the tongue length is proportional to the amount of time;
adjust the digital representation of the face to have the digital representation of the tongue extend out of the mouth with the determined tongue length; and
provide instructions to display, on the display, the digital representation of the face adjusted to have the digital representation of the tongue extend out of the mouth with the determined tongue length.

16. The system of claim 15, wherein the computing hardware is configured to determine the amount of time for which the tongue has been extended out of the mouth by:
for each image of the one or more images that depict the tongue extended out of the mouth, increasing a counter value by a predetermined amount, wherein the counter value is increasable up to a maximum value; and
for each image of the plurality of images that do not depict the tongue extended out of the mouth, decreasing the counter value by the predetermined amount, wherein the counter value is decreasable down to a minimum value.

17. The system of claim 16, wherein the computing hardware is configured to determine the tongue length for a digital representation of the tongue by:
determining the tongue length based on the counter value, wherein the tongue length is proportional to the counter value, wherein the maximum value corresponds to the tongue fully extended out of the mouth, and wherein the minimum value corresponds to the tongue fully hidden inside the mouth.

18. The system of claim 15, wherein the computing hardware is further configured to:
- determine a direction in which the tongue is extended out of the mouth within the one or more images;
- adjust the digital representation of the face to have the digital representation of the tongue extend out of the mouth in the determined direction; and
- provide instructions to display, on the display, the digital representation of the face adjusted to have the digital representation of the tongue extend out of the mouth in the determined direction.

19. The system of claim 18, wherein the computing hardware is configured to determine the direction in which the tongue is extended out of the mouth by:
- detecting, within an image of the plurality of images that does not depict the tongue extended out of the mouth, a plurality of landmark locations corresponding to lips of the face;
- identifying, based the one or more images that depict the tongue extended out of the mouth, one or more occluded landmark locations of the plurality of landmark locations, wherein the occluded landmark locations are occluded by the tongue; and
- determining the direction in which the tongue is extended out of the mouth based on a position of the one or more occluded landmark locations.

20. A non-transitory computer-readable storage medium having stored thereon instructions that, when executed by a computing device, cause the computing device to perform operations comprising:
- receiving, from a camera, a plurality of images representing a portion of a face containing a mouth, wherein one or more images of the plurality of images depict a tongue extended out of the mouth;
- determining, based on the plurality of images, an amount of time for which the tongue has been extended out of the mouth;
- determining, based on the amount of time for which the tongue has been extended out of the mouth, a tongue length for a digital representation of the tongue, wherein the digital representation of the tongue forms part of a digital representation of the face, and wherein the tongue length is proportional to the amount of time;
- adjusting the digital representation of the face to have the digital representation of the tongue extend out of the mouth with the determined tongue length; and
- providing instructions to display the digital representation of the face adjusted to have the digital representation of the tongue extend out of the mouth with the determined tongue length.

* * * * *